(12) United States Patent
Berrien

(10) Patent No.: US 12,326,700 B2
(45) Date of Patent: Jun. 10, 2025

(54) COI OPTIMIZER

(71) Applicant: SaLisa Berrien, Tampa, FL (US)

(72) Inventor: SaLisa Berrien, Tampa, FL (US)

( * ) Notice: Subject to any disclaimer, the term of this patent is extended or adjusted under 35 U.S.C. 154(b) by 0 days.

(21) Appl. No.: 18/487,041

(22) Filed: Oct. 13, 2023

(65) Prior Publication Data

US 2024/0111258 A1 Apr. 4, 2024

Related U.S. Application Data

(60) Continuation of application No. 17/318,869, filed on May 12, 2021, now Pat. No. 11,789,411, which is a division of application No. 15/616,557, filed on Jun. 7, 2017, now Pat. No. 11,036,192.

(60) Provisional application No. 62/347,328, filed on Jun. 8, 2016.

(51) Int. Cl.
| | |
|---|---|
| *G05B 13/02* | (2006.01) |
| *F24F 11/30* | (2018.01) |
| *F24F 11/47* | (2018.01) |
| *F24F 11/52* | (2018.01) |
| *F24F 11/58* | (2018.01) |
| *F24F 11/62* | (2018.01) |
| *F24F 11/64* | (2018.01) |
| *F24F 11/46* | (2018.01) |
| *F24F 11/63* | (2018.01) |

(52) U.S. Cl.
CPC .......... *G05B 13/0265* (2013.01); *F24F 11/30* (2018.01); *F24F 11/47* (2018.01); *F24F 11/52* (2018.01); *F24F 11/58* (2018.01); *F24F 11/62* (2018.01); *F24F 11/64* (2018.01); *F24F 11/46* (2018.01); *F24F 11/63* (2018.01)

(58) Field of Classification Search
CPC ....... G05B 13/0265; F24F 11/30; F24F 11/52; F24F 11/62; F24F 11/46; F24F 11/63
See application file for complete search history.

(56) References Cited

U.S. PATENT DOCUMENTS

| | | | |
|---|---|---|---|
| 8,600,571 B2 | 12/2013 | Dillon et al. | |
| 8,886,362 B2 | 11/2014 | Krok et al. | |
| 9,360,874 B2* | 6/2016 | Imes | H02J 13/00028 |
| 9,634,273 B2 | 4/2017 | Yang et al. | |
| 9,644,856 B1 | 5/2017 | Francis et al. | |
| 10,318,895 B1* | 6/2019 | Norwood | G06Q 10/0631 |

(Continued)

*Primary Examiner* — Zhipeng Wang
(74) *Attorney, Agent, or Firm* — Princeton IP Law LLC

(57) ABSTRACT

Examples disclosed herein relate to an energy optimizer device including a memory, one or more processors configured to execute an electronic game of energy saving and render the electronic game on a display. The energy optimizer device comprises hardware sensor or capturing device for obtaining equipment data from energy equipment associated with a user. The electronic game may be executed with one or more applications and configured to render badge level associated with a user's use of energy equipment, tips of energy saving, enrollment options of a demand management program, recommendation for upgrading of energy equipment, virtual reality avatar representing renewable resources registered, and information about incentives/rebates. The energy optimizer device may communicate with other energy optimizer devices in a peer-to-peer manner and enable multiple users to play the electronic game together from respective energy optimizer devices.

20 Claims, 27 Drawing Sheets

(56) References Cited

U.S. PATENT DOCUMENTS

| | | | | |
|---|---|---|---|---|
| 2011/0004350 A1* | 1/2011 | Cheifetz | .................. | F24F 11/30 |
| | | | | 340/870.02 |
| 2011/0046806 A1* | 2/2011 | Nagel | .................. | H04L 67/125 |
| | | | | 700/291 |
| 2011/0137763 A1* | 6/2011 | Aguilar | .............. | G06Q 30/0282 |
| | | | | 705/347 |
| 2011/0184574 A1* | 7/2011 | Le Roux | ........... | H02J 13/00028 |
| | | | | 700/291 |
| 2012/0233060 A1* | 9/2012 | Terano | .................... | G06Q 30/06 |
| | | | | 705/37 |
| 2013/0083193 A1* | 4/2013 | Okuyama | .............. | G08C 17/02 |
| | | | | 348/143 |
| 2013/0325190 A1* | 12/2013 | Imes | .................. | G05D 23/1919 |
| | | | | 700/286 |
| 2014/0336837 A1* | 11/2014 | Kiuchi | .............. | H02J 13/00004 |
| | | | | 700/295 |
| 2015/0145335 A1* | 5/2015 | Lyren | ........................ | G05F 1/66 |
| | | | | 700/291 |
| 2016/0284033 A1* | 9/2016 | Winand | ............... | G06Q 20/127 |
| 2017/0132701 A1* | 5/2017 | Kung | ..................... | G06Q 40/04 |

* cited by examiner

FIG. 4

← → ⟲ 🔒 Secure | https://uberforenergy.net/customer/update/curtailment    ⊙ 🔑 ☆ ◉ ⋮

👤 Board Members ▼

Demographics | Program Enrollment | Capacity Information —208

402 — Peak Demand (Summer) - kW
404 — [99999]
406 — Peak Demand (Winter) - kW
408 — [11111]
💾 Save Demand Response - Curtailment Measures ˅ —410

412 — How do you achieve your curtailment?
414 — [Backup Generators ▼]
416 — Device Type (Manufacturer)
418 — [            ]
420 — Meter Type
422 — [Choose one of the options ▼]
424 — Account Name *
426 — [            ]
428 — Date of Manufacture
430 — Account Number *
432 — Meter Number
434 — Enrollment Capacity (kW)
436 — Generator Size (kW)

Please select curtailments from below table to be submitted to the utility for approval: —438    ⊕ Add Curtailment —440

| Curtailment | Account Number | Account Name | Meter Type | Meter Number | Device Type | ICAP Tag | Enrollment Capacity (kW) | Registered Capacity (kW) | General Serial No | Generator Size (kW) | Generator Manufacturing Date | Actions |
|---|---|---|---|---|---|---|---|---|---|---|---|---|
| Backup Generators | 123456789 | First Floor | AMR | 12345678 | DT | 1233 | 1234 | 2345 | 7866oo | | 05/15/2017 | ✏️ ✖ |
| ☐ Equipment | asdfasdf | asdfasdf | AMI | asdfasdf | asdfasdf | | | | | | | ✏️ ✖ |
| ☐ Renewable | asdfasdf | asdfasdf | AMR | asdfasdf | asdfasdf | | | | | | | |

Submit

FIG. 6

| Customer Name | Program Type | Meter ID | Acknowledged? | Participation | kW Registered | kW Reduced | Performance |
|---|---|---|---|---|---|---|---|
| Large Scale Industry | Load Management, Standby Generators, Battery Storage | | | ✗ | 0.0 | | Performed |
| Board Members | Load Management, Standby Generators, Battery Storage | 12345678 | ✗ | ✗ | 2345.0 | | Over Performed |
| Duke Demo Customer | Load Management, Standby Generators, Battery Storage | MN054321 | ✗ | ✗ | 0.0 | | Performed |
| Rajat Patel | Load Management, Standby Generators, Battery Storage | 123456 | ✗ | ✗ | | | Under Performed |
| Small Biz Demo | Load Management, Standby Generators, Battery Storage | 1234567891 | ✗ | ✗ | | | Under Performed |
| Pranav B | Load Management, Standby Generators, Battery Storage | MN007 | ✗ | ✗ | | | Under Performed |
| Moin Haden | Load Management, Standby Generators, Battery Storage | | ✗ | ✗ | | | Under Performed |
| Medium Biz Demo | Load Management, Standby Generators, Battery Storage | MN009 | ✗ | ✗ | | | Under Performed |
| vaibhav smith email | Load Management, Standby Generators, Battery Storage | | ✓ | ✗ | | | Under Performed |
| Duke Demo Customer | Load Management, Standby Generators | MN054321 | ✗ | ✗ | 0.0 | | Performed |

Filter by State
☐ Georgia
☐ Florida
☐ California

Filter by City
☐ Tampa
☐ Orlando
☐ Miami

Filter by Zipcode
☐ 33123
☐ 33456
☐ 33789

Filter by Capacity
☐ Large
☐ Medium
☐ Small

Filter by Program
☐ Load Management
☐ Standby Generator
☐ Renewable Energy

| Program Names | Notice Period ⇵ | Event Start Time ⇵ | Event End Time ⇵ | Status ⇵ | Actions |
|---|---|---|---|---|---|
| Load Management, Standby Generators, Battery Storage | 6 Minutes | 05/19/2017 2:30 PM EDT | 05/31/2017 2:30 PM EDT | Completed | Show \| Delete |
| Load Management, Standby Generators | 11 Minutes | 05/05/2017 2:30 PM EDT | 05/05/2017 3:00 PM EDT | Completed | Show \| Delete |
| Load Management, Standby Generators | 13 Minutes | 04/29/2017 2:30 PM EDT | 04/29/2017 3:00 PM EDT | Completed | Show \| Delete |
| Load Management, Standby Generators | 15 Minutes | 05/05/2017 2:30 PM EDT | 05/05/2017 3:00 PM EDT | Completed | Show \| Delete |
| Load Management, Standby Generators | 13 Minutes | 04/29/2017 2:30 PM EDT | 04/29/2017 3:00 PM EDT | Completed | Show \| Delete |
| Load Management, Standby Generators | 15 Minutes | 04/22/2017 2:30 PM EDT | 04/22/2017 3:00 PM EDT | Completed | Show \| Delete |

Select Program Types — 902

ⓘ Demo Utility ▼

Please Select ▼ — 904

[Export Excel] — 906

908 — Search... 910 — 912 914 — [Add New] 916

| Customer Name | Program Name | Program Type | Zipcode | Registered Capacity | Actions |
|---|---|---|---|---|---|
| vaibhav smith email | Load Management, Equipment (Device), Resources, Standby Generators | Demand Response, Energy Efficiency, Renewable Energy, Rebates | 10001 | | ✓ ✎ ✗ |
| Medium Biz Demo | Load Management, Equipment (Device), Resources, Standby Generators | Demand Response, Energy Efficiency | 12345 | | ✓ ✎ ✗ |
| Zombie | | | 05495 | | ✓ ✗ |
| Hello World | | | 05495 | | ✓ ✗ |
| Rajat Patel | Load Management, Equipment (Device), Resources, Standby Generators | Demand Response, Energy Efficiency, Renewable Energy, Rebates | 05495 | | ✓ ✎ ✗ |
| Moin Haden | Load Management, Equipment (Device), Resources, Standby Generators, Battery Storage | Demand Response, Energy Efficiency, Renewable Energy, Rebates | 33612 | | ✓ ✎ ✗ |
| Pranav B | Equipment (Device), Resources, Standby Generators | Demand Response, Energy Efficiency, Renewable Energy, Rebates | 33612 | 2345 | ✓ ✎ ✗ |
| Board Members | Load Management, Equipment (Device), Resources, Standby Generators, Battery Storage | Demand Response, Energy Efficiency, Renewable Energy, Rebates | 99501 | | ✓ ✎ ✗ |
| Small Biz Demo | Load Management, Equipment (Device), Resources, Standby Generators | Demand Response, Energy Efficiency, Renewable Energy, Rebates | 10001 | | ✓ ✎ ✗ |
| Large Scale Industry | Load Management, Equipment (Device), Resources, Standby Generators, Battery Storage | Demand Response, Energy Efficiency, Renewable Energy, Rebates | 10001 | 0 | ✓ ✎ ✗ |

| Utility | Program Names | Notice Period | Event Start Time | Event End Time | Status | Actions |
|---|---|---|---|---|---|---|
| TECO | Standby Generator | 1 Minutes | 05/20/2017 12:19 AM IST | 05/27/2017 12:19 PM IST | Scheduled | Show \| Edit \| Cancel |
| Demo Utility | Load Management, Standby Generators, Battery Storage | 6 Minutes | 05/20/2017 12:00 AM IST | 06/01/2017 12:00 AM IST | Scheduled | Show \| Edit \| Cancel |
| TECO | Standby Generator | 6 Minutes | 05/24/2017 12:00 AM IST | 06/03/2017 12:00 AM IST | Scheduled | Show \| Edit \| Cancel |
| TECO | Standby Generator | 30 Minutes | 08/29/2017 9:30 PM IST | 08/29/2017 10:30 PM IST | Scheduled | Show \| Edit \| Cancel |
| Demo Utility | Load Management, Standby Generators | 25 Minutes | 07/28/2017 12:00 AM IST | 07/28/2017 12:30 AM IST | Scheduled | Show \| Edit \| Cancel |
| Demo Utility | Load Management, Standby Generators | 20 Minutes | 05/28/2017 12:00 AM IST | 05/28/2017 12:30 AM IST | Scheduled | Show \| Edit \| Cancel |

10 25 50 100

ON CLICK OF AT LEAST ONE PROGRAM NAME, "Start Now" BUTTON WILL BE ENABLED

Pending Authorization Requests

You have 45 pending authorization forms to approve.

Select Program Name
[ All ▼ ] ⓘ

| ▼ Program Type | ▼ Program Name | ▼ Account Name | ▼ Account Number | ▼ Device Type | ▼ View | ▼ Action |
|---|---|---|---|---|---|---|
| Backup Generators | Demand Response | ABC Groceries | 234567890 | Standby Generator | [PDF] | Approve |
| Load Management | Demand Response | ABC Foods | 123456789 | Battery | [PDF] | Approve |
| Energy Efficiency | Energy Efficiency | ABC Bakeries | 987654321 | Chillers | [PDF] | Approve |
| Energy Efficiency | Energy Efficiency | ABC Groceries | 234567890 | Motors | [PDF] | Approve |
| Renewable Energy | Renewable Energy | ABC Foods | 123456789 | Solar | [PDF] | Approve |
| Renewable Energy | Renewable Energy | ABC Bakeries | 987654321 | Wind | [PDF] | Approve |

COI OPTIMIZER

CROSS-REFERENCE TO RELATED PATENT APPLICATION

This Application is a Continuation of U.S. patent application Ser. No. 17/318,869, filed May 12, 2021, entitled "COI OPTIMIZER", which is a Division of U.S. patent application Ser. No. 15/616,557, filed Jun. 7, 2017, entitled "COI OPTIMIZER", which claims priority to U.S. Provisional Patent Application No. 62/347,328, filed Jun. 8, 2016, entitled "COI OPTIMIZER". The entire contents of these applications are incorporated herein by reference in their entirety.

FIELD

The subject matter disclosed herein relates to energy and behavior optimizing devices, methods, and systems. More specifically, the disclosure relates to providing one or more optimizing functionalities where one or more of these optimizing functionalities utilize one or more machine learning algorithms in order to improve customer engagement by helping reduce cost and monetize energy capacity in order to create a new flow of revenue.

Information

The energy industry has numerous energy users (e.g., residential, commercial, and/or industrial) located both worldwide and in the United States. Most of these energy users do not have a good understanding of their own energy usage/patterns, programs available, energy trading opportunities with utilities and/or peers, and/or other energy options. Further, most energy providers do not have a good understanding of their customers' energy patterns based on behaviors, energy equipment behind the meter, business needs, excess energy capacity available to sell, and/or energy needs. The optimizer devices and/or system (e.g., energy and/or behavior) is a dynamic transaction nexus where multiple inputs and users support two-way communication and digitization of the electrical-mechanical energy infrastructure and/or trading platforms between all user types (e.g., peer to peer, utility to industry, consumer to business, business to SmartCity, etc.).

BRIEF DESCRIPTION OF THE FIGURES

Non-limiting and non-exhaustive examples will be described with reference to the following FIGURES, wherein like reference numerals refer to like parts throughout the various FIGURES.

FIG. 4 is an illustration of a demand response database, according to one embodiment.

FIG. 6 is an illustration of a program database, according to one embodiment.

FIG. 7 is an illustration of an event database, according to one embodiment.

FIG. 9 is another illustration of a program database, according to one embodiment.

FIG. 10 is an illustration of customer sites around the world, according to one embodiment.

FIG. 12 is an illustration of a standby generator, according to one embodiment.

FIG. 13 is an illustration of a pending authorization request database, according to one embodiment.

DETAILED DESCRIPTION

Figure 1:
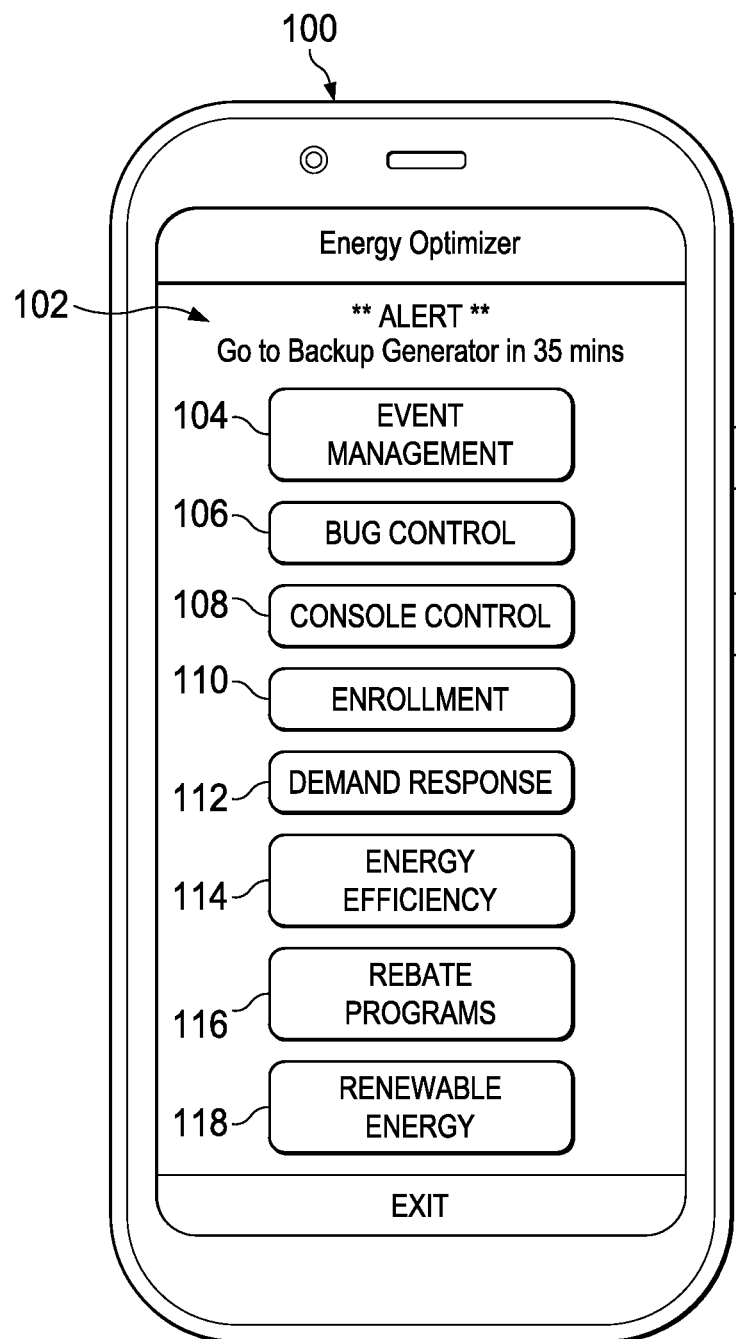
FIG. 1 is an illustration of an energy optimizer device, according to one embodiment.

In FIG. 1, an illustration of an energy optimizer device 100 is shown, according to one embodiment. The energy optimizer device 100 may be a mobile device, a workstation, a computer, a server, a wearable, and/or any combination thereof. The energy optimizer device 100 may include an alert area 102, an event management area 104, a backup generator ("bug") control area 106, a console control area 108, an enrollment area 110, a demand response (e.g., OptimizeDR) area 112, an energy efficiency (OptimizeEE) area 114, a rebate programs (e.g., OptimizeIN or OptimizeRB) area 116, a renewable energy (e.g., OptimizeRE) area 118, and/or any other area utilizing any functionality disclosed in this document. In one example, the alert area 102 shows a message that states "ALERT go to backup generator in 35 minutes". This message may be written, oral, and/or both. In addition, this message may request a confirmation, such as, "ALERT go to backup generator in 35 minutes—please state yes to confirm this implementation". Based on the confirmation to implement, one or more designated backup generators at one or more sites turns on at the 35 minute mark. In this example, the backup generators may be utilized for load curtailment (e.g., reduction in kW) and/or based on a price point (e.g., reduction in kWh) and/or an emergency (e.g., natural disaster).

In another example, the event management area 104 may allow two-way communication between one or more utilities, one or more smart cities, and one or more energy customers. Further, the two-way communication may be between customer to customer (e.g., peer-to-peer) and/or utility to smart city and/or smart city to customer. Further, the bug control area 106 may give customers the ability to control one or more backup generators from the energy optimizer device 100. In addition, the console control area 108 may allow customers to control one or more energy loads (e.g., HVAC, lights, motors, energy storage, solar panels, etc.) at one or more facility sites via the energy optimizer device 100. In one example, an energy user may get an alert that a super peak in energy prices is predicted to occur today at 12:33 PM and end at 1:15 PM. Based on this alert, the energy user schedules a reduction in an HVAC load for non-critical areas to occur from 12:30 PM to 1:30 PM.

In another example, the enrollment area 110 may allow customers and/or potential customers to register with the energy optimizer program and/or devices which enables access to various programs. For example, an energy user registers their 15 year old water heater that had an expected life of 12 years. Based on this information and/or data readings from the 15 year old water heater, an energy efficiency alert is transmitted to the energy user with all available rebates (and/or some rebates and/or some incentives) and an analysis of the cost/benefit of replacing the 15 year old water heater. In addition, the demand response area 112 may allow customers to check energy prices in real-time as well as participate in energy, capacity, ancillary services and/or other energy and non-energy reduction programs directly with the utility and/or grid operator without going through a third party. Further, the energy efficiency area 114 may allow customers to enroll and receive alerts relating to energy conservation programs for which the customer is eligible (and/or may be eligible) or customers that upgraded their equipment to energy efficient equipment without using a rebate can monetize the equipment by allowing the utility company to use the energy reduction for resource planning over the life of the equipment. The rebate programs area 116 may allow customers to enroll in and receive alerts regarding available incentive and/or rebate programs (e.g., Rebates on new HVAC, new motors, new lighting, etc.). The renewable energy area 118 may provide one or more renewable energy pricing options, renewable energy credits (e.g., REC's), energy options (e.g., wind, solar, water, etc.), and/or any combination thereof. For example, an energy user interested in solar power may receive an alert relating to a reduced installation cost and/or rebate associated with installing a new solar system. An energy user interested in buying or selling REC's may also see other users that are interested in selling or buying REC's. In another example, an egames tab may be utilized.

Any of the energy optimizer functionality may create one or more alerts with and/or without one or more confirmations. Further, all functionality can be initiated via touch, voice, automatically, sequentially, and/or any combination thereof.

In various examples, one or more energy optimizer devices and/or systems may provide one or more dynamic two-way communication tools (e.g., peer-to-peer) for multiple types of users and inputs to communicate back and forth with each other including energy providers, energy users, smart cities, facilities, community organizers, neighbors, businesses, industrial energy customer, residential energy customers, social networks, interest groups, electric devices, and/or any combination thereof. One or more energy optimizer devices and/or systems may utilize predicative analytics with machine learning techniques to provide personalized alerts to users based on behaviors, likes, energy equipment in their home and/or business, available capacity within a city, constraints on the electric grid and/or gas pipeline and/or water distribution system to improve energy performance, improve financial opportunities through monetizing assets, improve community engagement in Smart Cities, improvement in supply chain management, improvement in social networks, and/or any combination thereof. In one example, based on one or more signal and/or machine learning and/or one or more equipment profiles, and/or one or more energy profiles, one or more alerts may be transmitted relating to when a piece of equipment (water heater) is not operating efficiently, requires maintenance, and/or is prone to failure.

In various examples, the unique function of this disclosure may take information that is disseminated in a fragmented manner without unique value creation for each receiver and provide a tailored approach that delivers value to each user. From energy solutions that incent customers to improve their energy performance, help optimize the electric grid, reduce carbon footprint, use renewable energy, help with utility integrated resource planning through energy efficiency credits to managing monthly budgets, providing alerts on social activities, engaging consumers on how to make their cities smarter by buying and selling excess energy capacity to each other and bypassing the utility company, which can make overall energy use more energy efficient.

For example, demand response, energy efficiency/energy conservation, renewable energy including battery storage, solar, wind, electric vehicles, rebate program alerts, automated communication portal, outage and update alerts, energy behavior analytics, customer data repository, billing alerts, real-time pricing, automatic curtailment, facility equipment inventory management, facility inventory management, electric vehicles to participate in energy markets, capacity credits (DRC), energy efficiency credits (EEC), renewable energy credits (RECs) to improve earnings, customer satisfaction, reduce cost, carpool sharing alerts, equipment life alerts, locating qualified caregivers in local vicinity, identify non-profits with volunteering opportunities that match your passion within your community, Energy Best Practices by peers, neighbors and experts (identify energy conscious businesses/consumers that share their secrets to creating a carbon-free environment), identify users similar to each other to collaborate or learn from, Educate button quickly educates individuals on current events and/or happenings, Empower button provides individuals with information to make informed decisions and the Impact button enables energy users to positively impact the space these energy user occupy with all things optimization via the one or more energy optimizer devices and/or systems.

In one example, the one or more energy optimizer devices and/or systems may be one or more dynamic two-way engagement tools that provide buyers and sellers of energy, energy efficiency programs, renewable energy, capacity, storage, etc. to directly communicate with each other in a fast, simple and cost effective manner "all under one portal" to take advantage of such resources with and/or without energy provider interactions.

In another example, the one or more energy optimizer devices and/or systems may be used as a service offered to utility companies for better engagement with their customers resulting in improved customer satisfaction, increase in earnings, and/or reduction in carbon footprint.

In another example, the one or more energy optimizer devices and/or systems may allow energy users to help protect the environment by enrolling in one or more energy optimizer programs while reducing their energy consumption and put dollars back in their pocket for doing the right thing. Go Green, Save Green!!.

In another example, the one or more energy optimizer devices and/or systems may provide utilities with quick access to Demand-Side Resources (i.e. Renewable Energy programs, Energy Efficiency programs, Demand Response programs, Storage programs, etc.), behind the customer's meter, available to them under one portal to help heal the grid by zip code, region, etc. In one example, utilities will be able to call on specific resources within a specific area with a touch of a button depending on the type of system challenge they are experiencing. For example, an energy provider may call on one or more energy customer with thermal and/or energy storage capacity in Lehigh Valley region due to low output from solar systems in the area as a result of limited hours of the sun shining during one or more super peak demand time periods.

In another example, the one or more energy optimizer devices and/or systems may provide consumers and businesses with quick access to dashboard of energy capacity available to buy or sell (i.e. Renewable Energy programs, Energy Efficiency programs, Demand Response programs, Storage programs, etc.). For example, a first energy user may receive an alert via the dashboard that wind power is available for X cost and then the first energy user may press a button and buy 1000 MWh. In another example, an energy customer with excess credits of Y receives an alert that Y credits are at a D price and by voice command the energy customer sell 100 units of Y credits at the D price.

In another example, the one or more energy optimizer devices and/or systems may provide measurement and verification for energy programs managed by the portal (i.e. Optimize DR, etc.).

In another example, the one or more energy optimizer devices and/or systems may provide real-time energy information available to clients in order for them to make informed energy decisions on energy usage to manage their cost and energy waste. In one example, an energy user for X energy provider receives an alert that switching to Y energy provider latest offer will save the energy user $10,000 over the next 3 months. In this case, the energy user switches from X energy provider to Y energy provider in one easy step.

In another example, the one or more energy optimizer devices and/or systems may provide predictive analytics tool on user behaviors to show a better way to improve energy performance by eliminating energy waste. For example, based on one or more data points received from a lighting source, machine learning, energy usage profiles, equipment usage profiles, equipment history, and/or any combination thereof, an alert is triggered that the lighting system is rapidly becoming inefficient.

In another example, the one or more energy optimizer devices and/or systems may show users where they have excess capacity based on machine learning techniques used with the predicative analytics tool in order to monetize those assets and sell back to Utility or to other users. For example, an energy user may have an HVAC system, a backup generator, and a battery unit. In a first example, based on the production schedule (e.g., high production) and/or any other factor, the battery unit may be utilized to sell power and/or reduce an energy billing demand. In another example, based on the production schedule (e.g., low production) and/or any other factor, the HVAC system may be utilized to reduce an energy billing demand.

In another example, the one or more energy optimizer devices and/or systems may aggregate energy profiles of users that have excess capacity in order to provide Utility with robust resources to support the electric grid through a virtual power plant.

In another example, the one or more energy optimizer devices and/or systems may develop a Facility Equipment Inventory System that captures all energy using equipment behind the customer's meter in order to streamline the rebate process for users interested in taking advantage of receiving alerts for rebates they qualify for.

In another example, the one or more energy optimizer devices and/or systems may utilize a Facility Equipment Inventory System which provides information on equipment life and provides alerts on when to change out equipment, the impact of keeping inefficient equipment, and recommendations of replacement equipment. In another example, the one or more energy optimizer devices and/or systems may help users understand the opportunity cost of keeping inefficient equipment.

In another example, the one or more energy optimizer devices and/or systems may provide information alerts to users located in a designated SmartCity about all things energy (i.e. availability of energy capacity for sale, interested parties in buying energy capacity, energy programs, where to purchase renewable energy, etc.).

In another example, the one or more energy optimizer devices and/or systems may provide information alerts to users in a designated SmartCity about happenings and resources available in their area.

In another example, the one or more energy optimizer devices and/or systems may provide Smart Cities with technology to bring fragmented suburban communities together with two-way communication to appeal to residents and businesses alike (focus is on the intended outcomes of those cities with improved community engagement being one of the top priorities).

In another example, the one or more energy optimizer devices and/or systems may provide consumers and businesses with a gamification tool that motivates and inspires users to improve their energy performance by entertaining and compensating them for helping to make the world more energy efficient.

Figure 31:
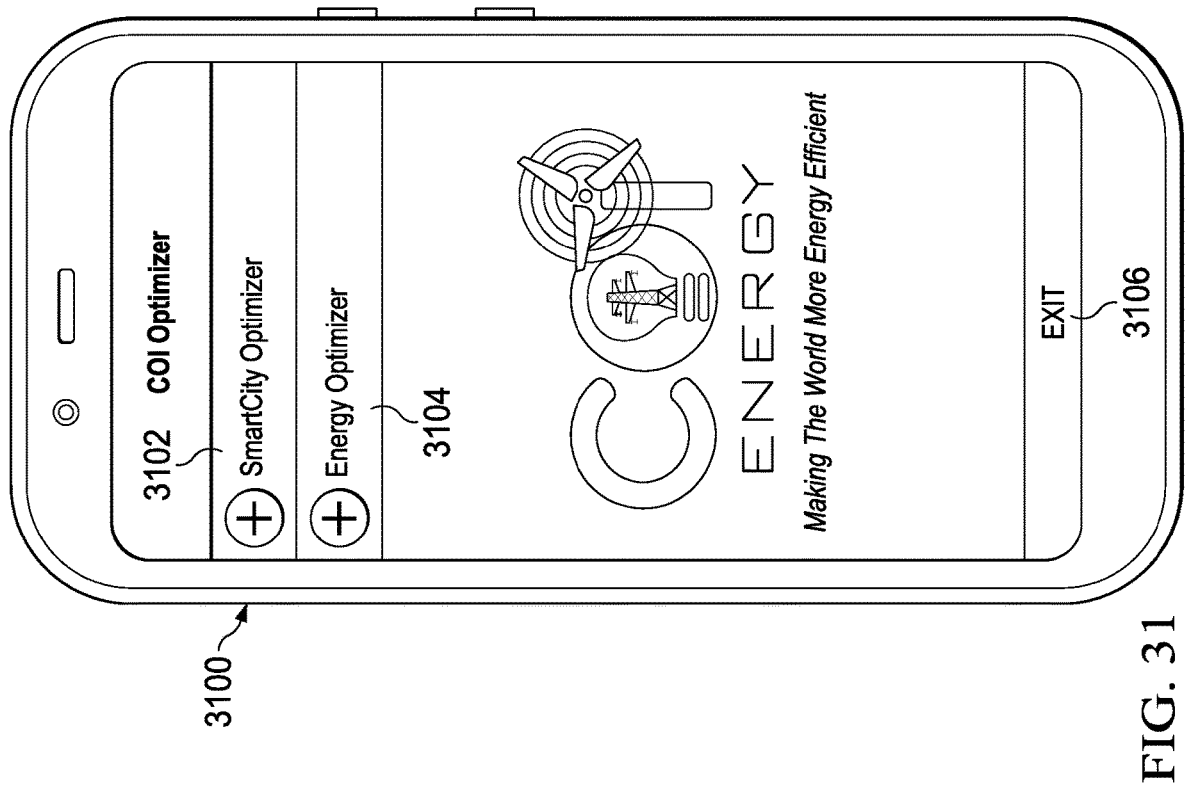
FIG. 31 is an illustration of an energy optimizer device, according to one embodiment.

In FIG. 31, an illustration of an energy optimizer device 3100 is shown, according to one embodiment. The energy optimizer device 3100 may include a SmartCity Optimizer button 3102 and/or an Energy Optimizer button 3104, and/or an exit button 3106. The COI Optimizer provides various solutions for its users. In FIG. 31, user may be able to select the Energy Optimizer, SmartCity Optimizer, or any other Optimizer solution offered under the COI Optimizer brand including any emerging markets. Once the user selects the Energy Optimizer, all programs available appear on the users mobile device or web as described in FIG. 32.

Figure 32:
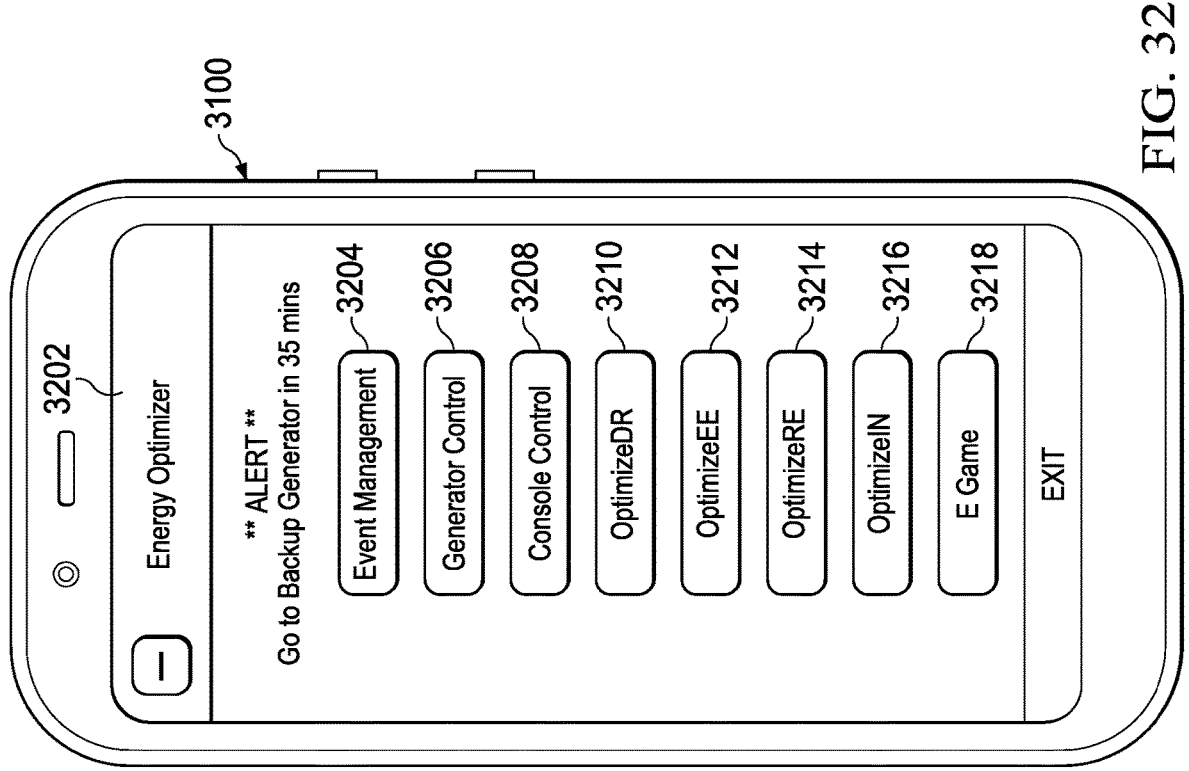
FIG. 32 is an illustration of an energy optimizer device, according to one embodiment.

As shown in FIG. 32, the energy optimizer device 3100 (and/or optimizer device for non-energy solutions) may include an expand button and title area 3202, an event management button 3204, a generator control button 3206, a console control button 3208, an OptimizeDR button 3210 (Demand Response), an OptimizeEE button 3212 (Energy Efficiency), an OptimizeRE button 3214 (Renewable Energy), an OptimizeIN button 3216 (Incentive and/or rebate), and/or an E game button 3218. In one example, the event management button 3204 may be utilized to join one or more events (e.g., demand response event, training, workshop, energy trading, etc.).

Figure 33:
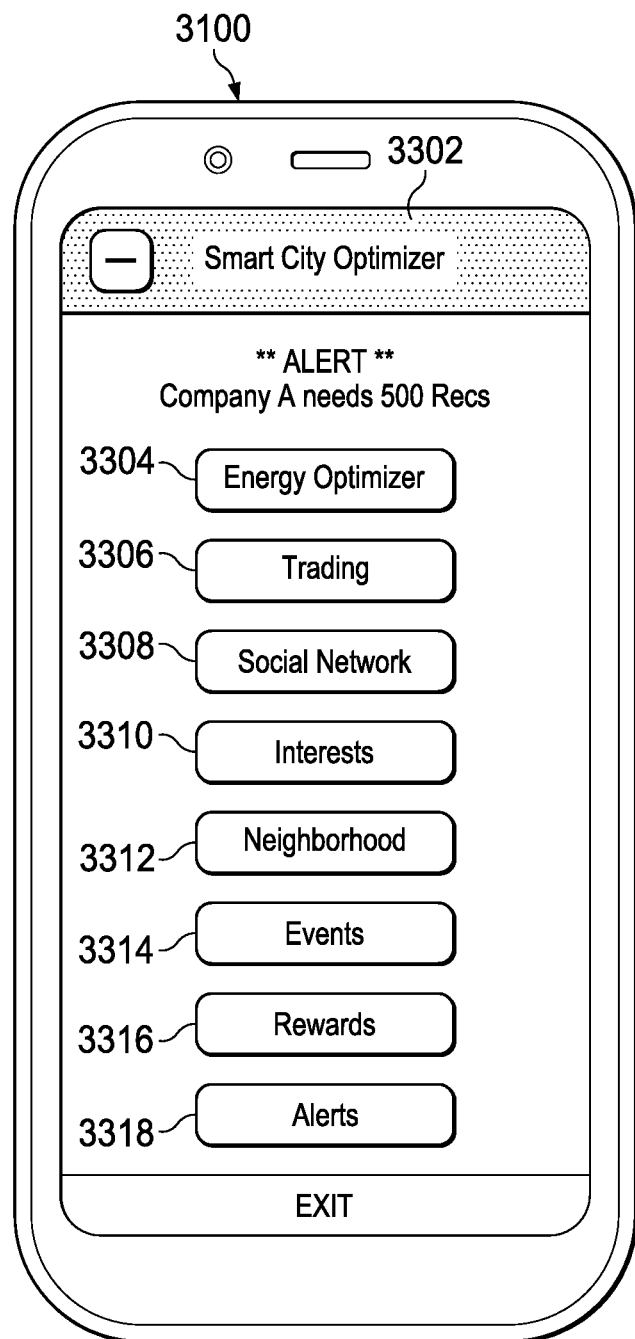
FIG. 33 is an illustration of an energy optimizer device, according to one embodiment.

In FIG. 33, an illustration of an energy optimizer device 3100 is shown, according to one embodiment. In this example, the energy optimizer device 3100 (and/or optimizer device) may include a title area and message area 3302, an energy optimizer button 3304, a trading button 3306, a social network button 3308, an interests button 3310, a neighborhood button 3312, an events button 3314, a rewards button 3316, and/or an alerts button 3318. In one embodiment, the SmartCity Optimizer provides Smart Cities with a way to better engage their community in a Fast, Simple and Economical manner. The SmartCity Optimizer provides several programs to engage its community. The programs are unique to the offerings in the specified City. For example, City Y enables their community to trade power without the involvement of the electric power company (via the trading button 3306). User Y clicks on the Trading button 3306 to see what opportunities are available for energy trading. She finds that she is able to sell some of her RECs (Renewable Energy Credits) to Company A that put in a request to buy 500 RECs (see title and message area 3302). Company A buys 300 RECs from User Y and 200 RECs from Company T. Company A settles its transactions using the COI Optimizer merchant account, one or more utility accounts, and/or one or more Smart City accounts.

In another example, the User receives an alert on the dashboard stating that Company A needs 500 RECs (see title and message area 3302). The User clicks on the alert and processes 500 RECs to the company. The transaction is processed through the COI Optimizer merchant account, one or more utility accounts, and/or one or more Smart City accounts.

In another example, a user in a Smart City has purchased the Energy Optimizer solution. The user is able to manage its program participation through the SmartCity Optimizer and place any excess capacity it has to sell on the Smart City dashboard for others in the community to be able to purchase including its peers, businesses, etc. The user does not have to sell only to the Utility (energy provider), it can sell to any users in the Smart City community and beyond.

In another example, User C is interested in seeing if any of the members in her social network are enrolled in the SmartCity Optimizer. She clicks on the Social Network tab (social network button 3308) and finds that of the 1000 members in her social network, 200 of them are enrolled in the SmartCity Optimizer. She pings a few of them to set-up a subgroup focused on their common interest in the community.

In another example, User D has various interests and would like to set up alerts to receive specific information about Chia Pet activities in the area. She is not sure exactly what her real interest are so she selects the Interest button 3310 to learn about the categories of interest. She then selects the "Educate" button from the list of buttons that also include Educate, Empower, and Impact. She learns about various information on Chia Pets including local and regional activities. She selects the local competitions on Chia Pets. That then prompts her to click the "Empower" button in order to register for the activity. The "Impact" button speaks to all the ways she could make a difference in the Chia Pet space including what she has done to date and what others have done. Based on her defined interest she selects from the "Educate" section, she will begin receiving alerts on a frequency basis she defines.

In another example, a User clicks on Neighborhood button 3312 and sees what is happening in the neighborhood. They can set-up preferences to find out about shows coming to the area with details on date. Location, cost and how to get discount tickets or barter tickets. Also, they can check to see how busy the emergency rooms are in their neighborhood and pre-register at the ER of their choice so when they get to the hospital, they can go straight to the back to see the nurse or doctor.

In another example, User A can register for the Rewards program via rewards button 3316. It covers various programs including stores, gas stations, electric power, leadership, etc. Under the Rewards program, a User can receive local, regional and/or national recognition for her efforts in cleaning up the environment. She would be touted as a local expert with the ability to move to a regional and/or national expert level based on the number of talks, the work and other activities she has performed in the specific domain.

Figure 2:
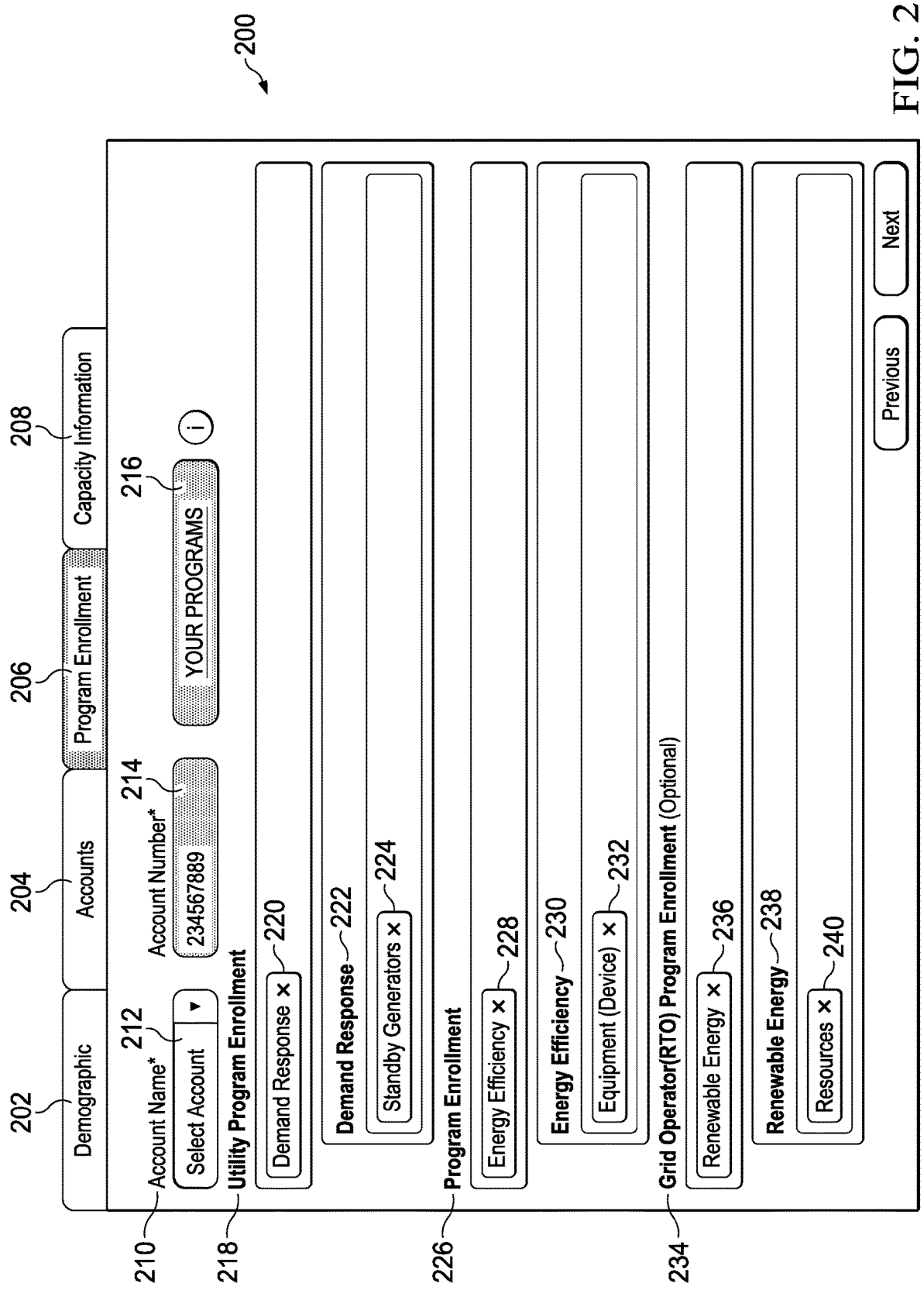
FIG. 2 is an illustration of a client screen, according to one embodiment.

In FIG. 2, an illustration of a client screen 200 is shown, according to one embodiment. The client screen 200 may include a demographic tab 202, an accounts tab 204, a program enrollment tab 206, a capacity information tab 208, and/or any other tab. The demographic tab 202 may include one or more demographic information for the client. The accounts tab 204 may include one or more accounts (e.g., multiple energy utilization sites) and/or accounts data for the client. The capacity information tab 208 may include one or more capacity information (e.g., backup generators, battery units, cogeneration, etc.) for the clients. Further, the capacity information may be for one or more client sites (e.g., backup generator 1 (e.g., 100 kW—size one) at site 1, backup generator 2 (e.g., 2000 kW—size two) at site 2, a first sized battery unit at site 2, backup generator N (e.g., 10,000 kW size N) at site N, and/or an N−1 sized battery unit at site N−1).

The program enrollment tab 206 (highlighted) may include an account name 210, a select an account button 212, an account number area 214, a client programs area 216, a utility program enrollment 218, a demand response area 220, a client demand response area 222, and one or more client demand responses 224, an energy optimizer program enrollment area 226, an energy efficiency area 228, a client energy efficiency area 230, and one or more client energy efficiency options, a grid operator program enrollment 234, a renewable energy 236, a client renewable energy area 238, and/or one or more client renewable energy options 240.

Figure 3:
FIG. 3 is an illustration of a customer data screen, according to one embodiment.

In FIG. 3, an illustration of a customer data screen 300 is shown, according to one embodiment. The customer data screen 300 may include the demographic tab 202 which may include a customer name area 302, a customer type area 304 (e.g., residential, commercial, industrial, etc.), a rate schedule area 306 (which shows the rate structure for this specific site and/or all sites), a contact name area 308, an email address area 310, a mobile phone number area 312, a phone number area 314, an email notification area 316, an SMS notification area 318, a phone notification area 320, an alarm notification area 322, a service address street area 324, a service address city area 326, a service address state area 328, a service address zip code area 330, a copy service address to mailing address area 332, a mailing address street area 334, a mailing address city area 336, a mailing address state area 338, and/or a mailing address zip code area 340.

In FIG. 4, an illustration of a demand response database 400 is shown, according to one embodiment. The demand response database 400 may include the capacity information area 208 which may include a peak summer demand area 402, a peak summer demand 404 (e.g., 1,200 kW, 5,000 kW, etc.), a peak winter demand area 406, a peak winter demand 408 (e.g., 900 kW, 3,000 kW, etc.), a demand response area 410, a how do you achieve curtailment area 412, one or more curtailment options 414, a device type area 416, a client device type area 418, a meter type area 420 a client meter type area 422, an account name area 424, a curtailment equipment number 426, a date of manufacture for the curtailment equipment area 428, an account number area 430, a meter number area 432, an enrollment capacity area 434, a generator size area 436, a second enrollment capacity area 438, and a total registered capacity area 440.

Figure 5:
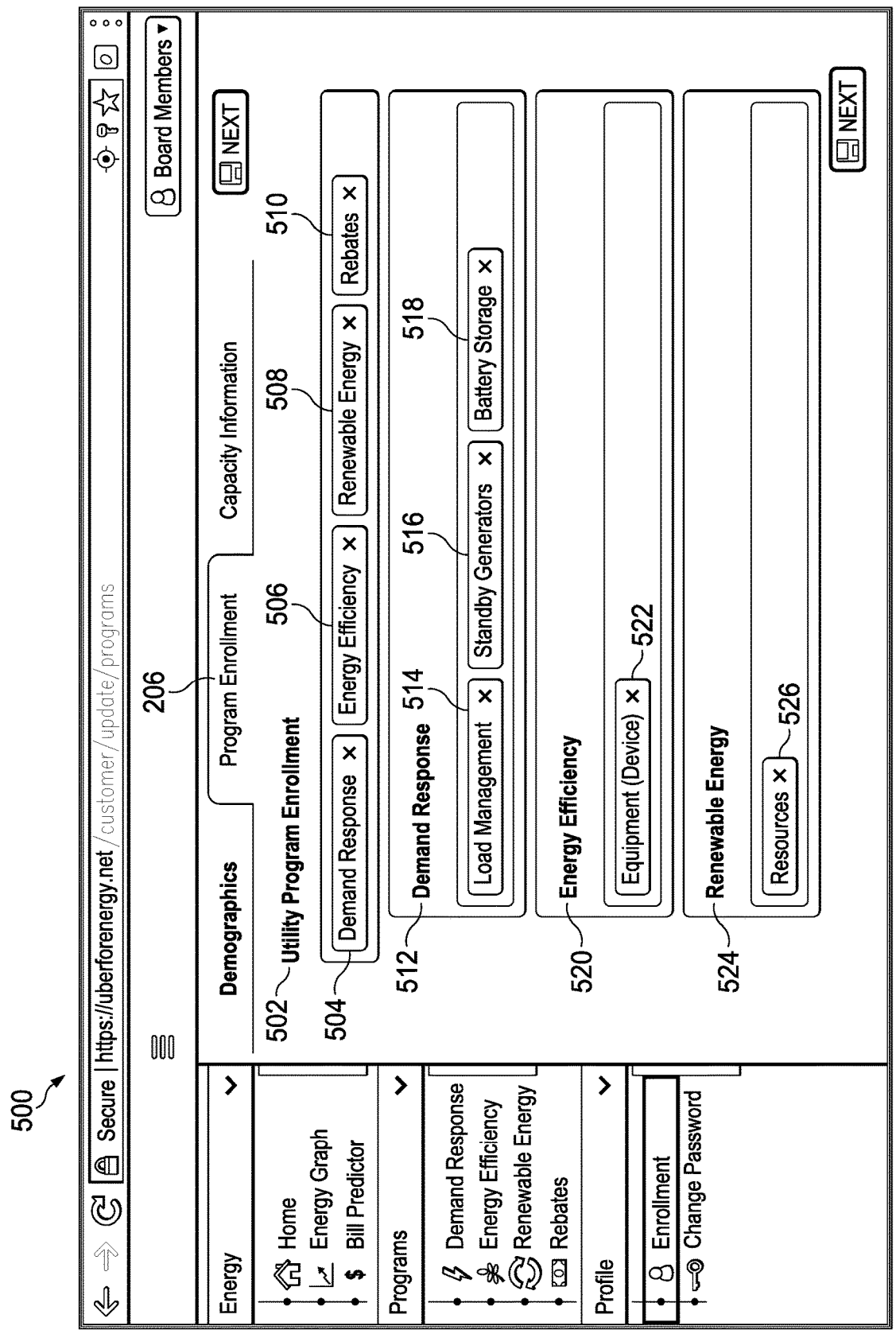
FIG. 5 is an illustration of a utility program enrollment data, according to one embodiment.

In FIG. 5, an illustration of a utility program enrollment data 500 is shown, according to one embodiment. The utility program enrollment data 500 may include the program enrollment tab 206 which may include a utility program enrollment area 502 with a first program option 504 (e.g., demand response option), a second program option 506 (e.g., energy efficiency option), a third program option 508 (e.g., renewable energy option), and/or an Nth program option 510 (e.g., rebates option). In one example, a demand response option area 512 may include a first demand response option 514 (e.g., load management), a second demand response option 516 (e.g., a standby generator), and/or an Nth demand response option 518 (e.g., battery storage). In addition, an energy efficiency option area 520 may include a first energy efficiency option 522 (e.g., equipment) and/or an Nth energy efficiency option (e.g., lighting, HVAC, etc.). Further, a renewable energy option area 524 may include a first renewable energy option 526 (e.g., wind), a second renewable energy option (e.g., biomass), a third renewable energy option (e.g., solar), a fourth renewable energy option (e.g., hydro), and/or an Nth renewable energy option (e.g., thermal).

In another example, the one or more energy optimizer devices and/or systems may allow customers to take full advantage of the "Energy Cloud" by improving their energy performance, reducing carbon footprint and monetizing their energy assets with the real-time data they receive in the COI Optimizer (e.g., energy optimizer devices and/or systems). In one example, demand response optimizer may provide the Utility company and end-use customers with quick access to customer-side energy resources to help heal the grid.

In another example, the one or more energy optimizer devices and/or systems may allow two-way communication between the Utility and the end-use customer, customer to customer, utility to utility, facility to facility, device to facility, device to utility, etc. In another example, the one or more energy optimizer devices and/or systems may allow Utility Companies with Event and Program Management for Demand Response to communicate with one or more energy customers. It can provide alerts for Power Outages, Real-time Pricing for Electric and Natural Gas. Also, by carefully interpreting end-use customer past behavior, a bill predictor module in the OptimizeEE may use that information to predict future usage behavior in providing insights that automatically deliver timely, interactive, and relevant communications that help drive business outcomes.

In another example, the one or more energy optimizer devices and/or systems may produce better outcomes, lowers customer's cost to serve, and achieves higher customer satisfaction.

In another example, the one or more energy optimizer devices and/or systems may allow the Facility Manager at XYZ Hospital to respond to alerts she/he received from ABC Utility to switch to back up generators because the electric grid is constrained. The Facility Manager can send a quick notice back to the Utility informing them they are having problems with the generator, but they are able to reduce the HVAC load to make up for their installed capacity commitment. This communication is fast because the Facility Manager is able to respond through her/his vehicle telematics, on her wearable device, her computer in her office, her mobile device, the demand response optimizer application, and various other methods within seconds of notification.

In another example, the one or more energy optimizer devices and/or systems may allow a large industrial or commercial customer to automate its participation in the demand response program by registering its installed capacity (energy-using equipment) with the COI Energy Optimizer. By the click of a button in the energy Optimizer, the industrial/commercial customer can make its capacity available to the Utility Company and/or Grid Operator by automatically curtailing pre-specified load or by automatically turning on its backup generator (BUG). This enables quick participation in programs like capacity, ancillary services, regulation, energy and others.

In another example, the one or more energy optimizer devices and/or systems may capture the meter data, the application can predict high bills weeks before they hit—and help end-use customers get on track for lower bill. The Utility can deploy a large, opt-out program to forecast high bills and deliver personalized customer alerts combined with continuous support.

In another example, the one or more energy optimizer devices and/or systems may take dozens (e.g., a plurality, multiple, 100, 1000s, etc.) of reads a day, smart meters and/or smart devices may give a clear window into customers' energy habits. Targeting homes or businesses whose load curves peak in the late afternoon. In summer, Utilities can run behavioral demand response programs—and with using analytics and automation can deliver personalized, real-time energy savings advice alerts to more customers. The Utilities can dramatically cut peak load on the summer's hottest days, reduce their operational costs, and help customers save big money on their bills. At a macro level, Utilities can detect common patterns for better load balancing and determining which customers are more likely to benefit from programs to help reduce their energy use or flatten their energy profile (see FIG. 26).

In another example, the one or more energy optimizer devices and/or systems may include real-time pricing of energy and/or natural gas for purposes of end-use customer to make informed energy decisions on when to buy energy, sell energy, and when to curtail loads to participate in market driven energy, capacity and/or ancillary services markets.

In another example, the one or more energy optimizer devices and/or systems may be enabled in a vehicle's telematics to have easy access to the tool for optimize program participation. Enrollment can occur through voice prompts or depressing a button. If Lynn is driving her vehicle and receives an alert through her vehicle telematics that shows the price of energy has exceeded her preset threshold. She can activate her participation in the economic energy market by sending a voice prompt or depressing a button on her telematics to sell 3 MW of power for as long as the cost of energy is above $400/MWh (a first cost/selling amount). This will automatically curtail the loads in her plant that were pre-determined for such demand response events. In one example, this energy user may sell power from their backup generator as long as the selling price is $400/MWh and this energy user may sell power by using one or more battery units when the selling price is above $500/MWh (a second cost/selling amount)

In FIG. 6, an illustration of a program database 600 is shown, according to one embodiment. In this example, the program database 600 shows an events search functionality. For example, the search functionality has focused on one or more states, cities, zip codes, energy capacity, and/or programs with a searching filter 604. In this example, a search results button 602 can be utilized to select one or more search results 606.

In FIG. 7, an illustration of an event database 700 is shown, according to one embodiment. In this example, the event database 700 includes a program name area 702, a notice period area 704, an event start time area 706, an event end time area 708, an event status area 710, and an event actions area 712 for one or more program options 714. For example, a first backup generator may be scheduled with a 30 minute notice period while a second backup generator may be scheduled with a 3 hour notice period.

Figure 8:
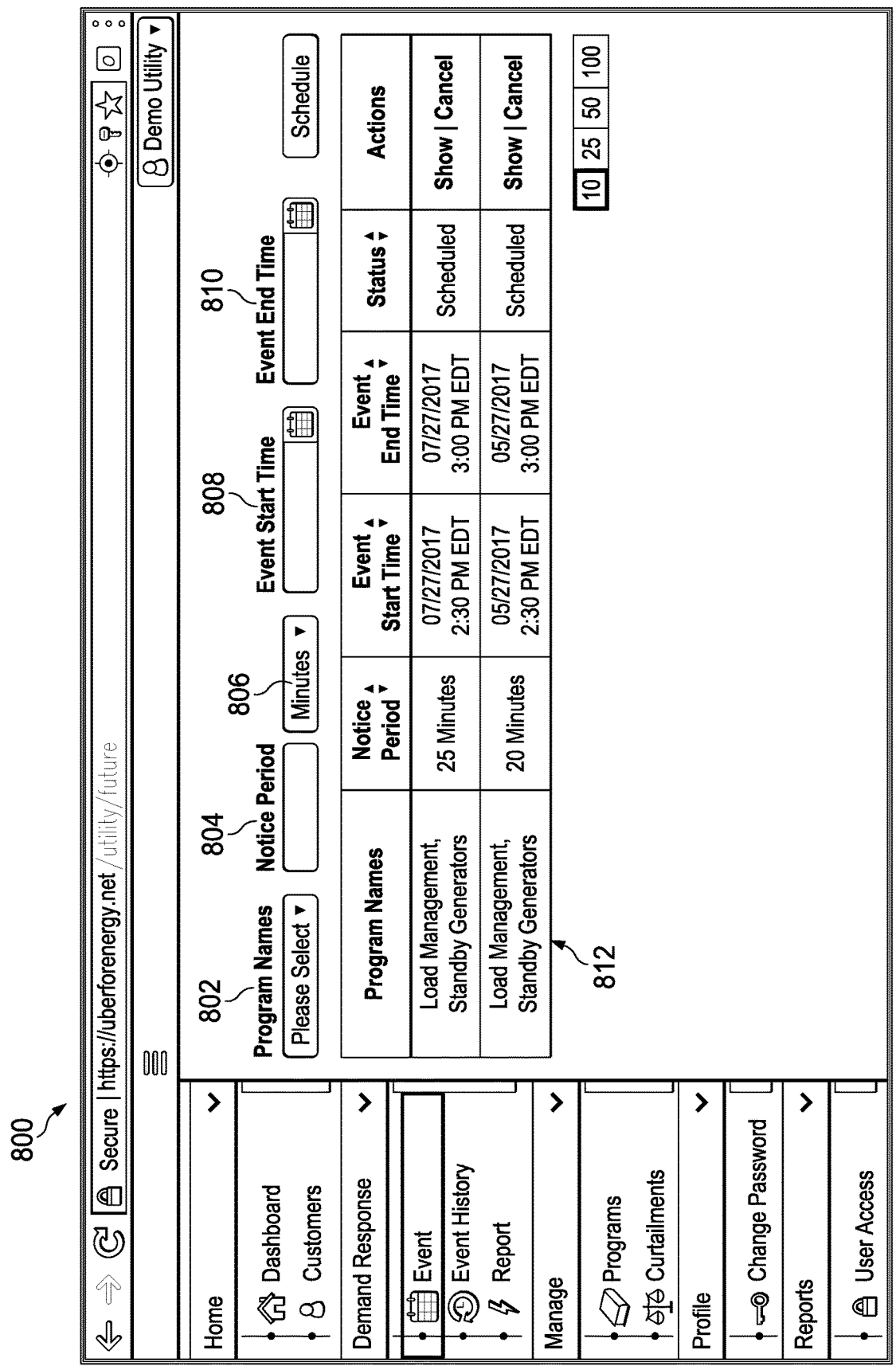
FIG. 8 is another illustration of an event database, according to one embodiment.

In FIG. 8, another illustration of an event database 800 is shown, according to one embodiment. In this example, the event database 800 includes a program name area 802 a notice period area 804, a notice period time unit area 806 (e.g., minutes, hours, days, weeks, etc.), an event start time area 808, and an event end time area 810 which can be utilized to enter information relating to one or more program events 812.

In FIG. 9, another illustration of a program database 900 is shown, according to one embodiment. In this example, the program database 900 includes a program type filtering area 902, a program type search button 904, a customer name area 906, a program name area 908, a program type area 910, a location area 912, a registered capacity area 914, and an actions area 916. In this example, the search has resulted in numerous results with various customers 918, various program names 920, and various program types 922. In this example, the energy optimizer device 100 may be able to generate a report with all of the various programs, energy devices, and a total available capacity for a specific grid zone and/or the entire grid. This information could be utilized for grid stabilization, repair, maintenance, and/or any other reason. In one example, a first grid zone may be having voltage issues which could be solved by utilizing one or more energy storage devices (e.g., battery units) at one or more energy users' sites.

Figure 10:
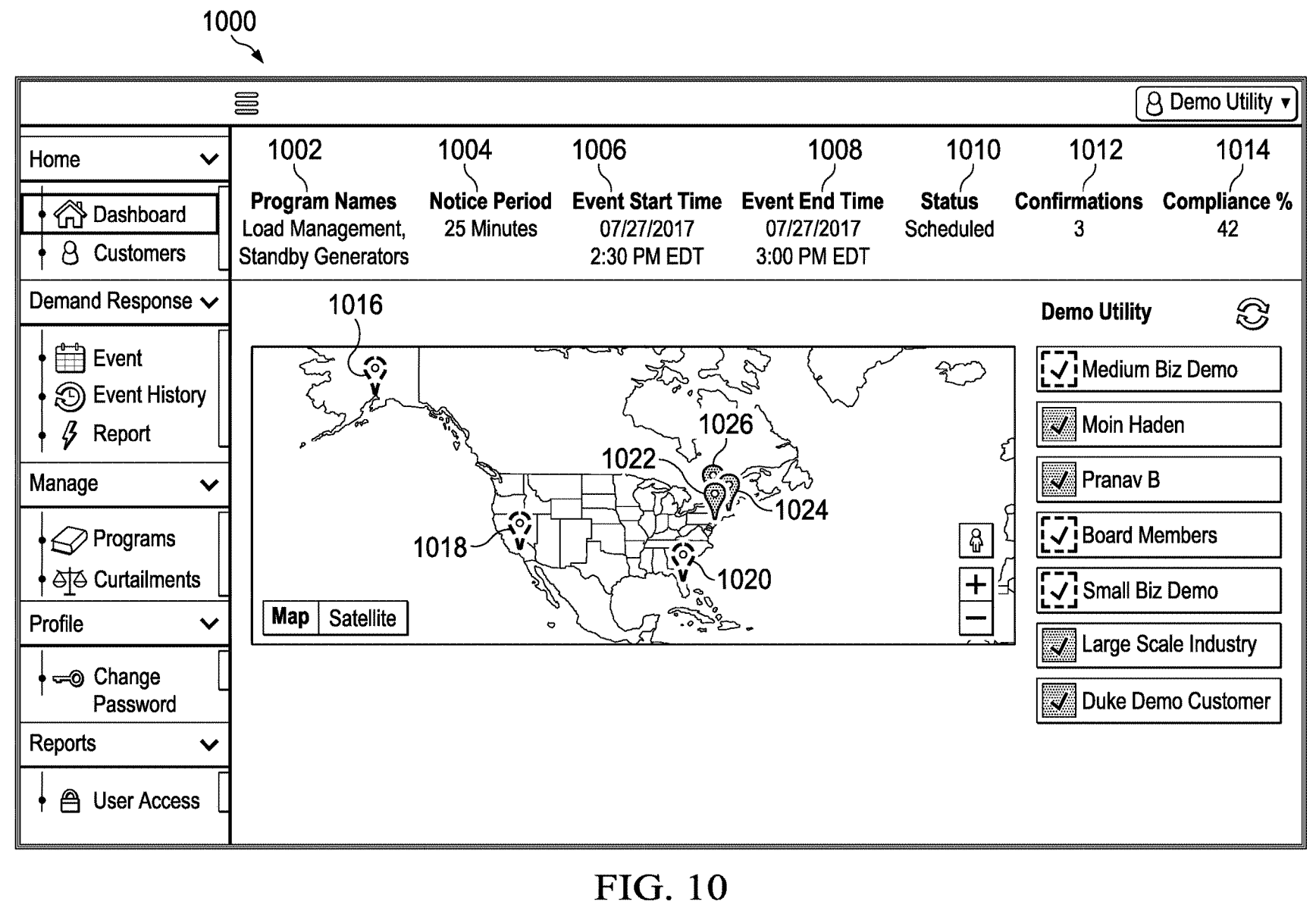

In FIG. 10, an illustration 1000 of customer sites around the world is shown, according to one embodiment. In this example, the illustration 1000 includes a program name area 1002, a notice period area 1004, an event start time area 1006, an event end time area 1008, an event status area 1010, an event confirmation area 1012, a compliance area 1014, a first site 1016, a second site 1018, a third site 1020, a fourth site 1022, a fifth site 1024, and an Nth site 1026. In this example, generators at one of more of these sites may be turned on at the event start time and turned off at the event ending time. In addition, after the generators at the one or more sites are turned on and then off, the compliance area 1014 may calculate a new compliance number, one or more reports may be generated, one or more accounting functions may be initiated, one or more confirmation functions may be initiated, one or more notice functions may be initiated, and/or any other functionality linked to the event may be initiated. In one example, a first lighting energy project at a first site may be under consideration while a second lighting energy project at a second site may also be under consideration for implementation. Based on the energy cost, incentives, and/or rebates, the first lighting energy project may be implemented instead of the second lighting energy project.

Figure 11:
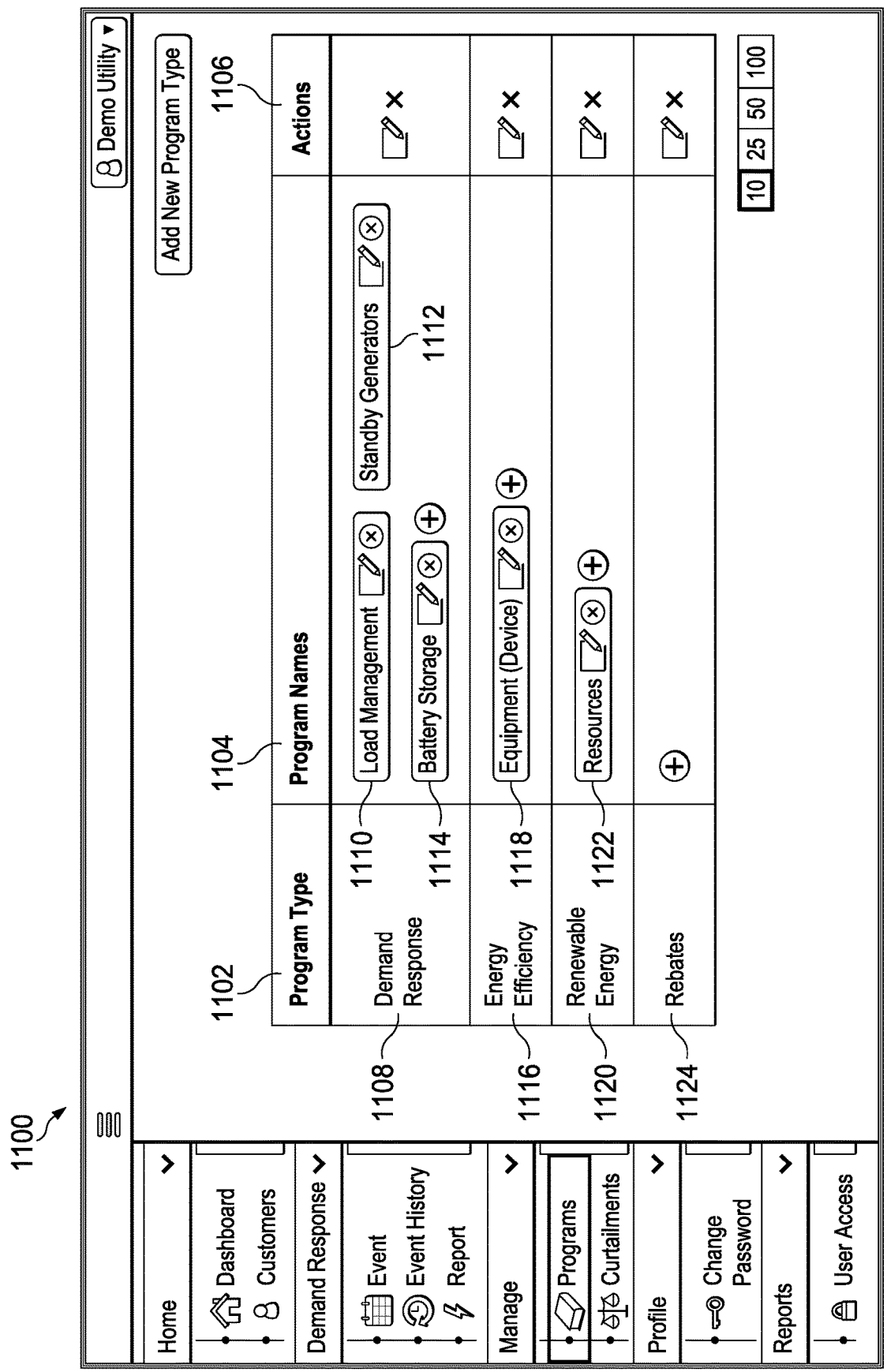
FIG. 11 is another illustration of a program structure, according to one embodiment.

In FIG. 11, another illustration of a program structure 1100 is shown, according to one embodiment. In this example, the program structure 1100 may include a program type area 1102, a program name area 1104, a program action area 1106, a demand response area 1108 with a first demand response option 1110 (e.g., load management), a second demand response option 1112 (e.g., generators), an Nth demand response option 1114 (e.g., battery storage), an energy efficiency area 1116 with a first energy efficiency option 1118 (e.g., equipment), a renewable energy area 1120 with a resource option 1122, and a rebate area 1124. For example, a priority schedule may be utilized to determine which piece of equipment is utilized first, second, third, and/or nth under a first scenario while different pieces of equipment are utilized in a different order under a second scenario.

In another example, the one or more energy optimizer devices and/or systems may via Energy Efficiency Optimizer and/or Energy Efficiency Optimizer Module assesses end-use customers equipment inventory for their home or business. Based on the age of the equipment, efficiency, Bluetooth capability and other factors, the Optimizer is able to provide personalized alerts regarding the effectiveness of the equipment and if any incentives are available to improve performance of the equipment. Modern appliances/equipment use significantly less energy than older appliances/equipment. The COI Optimizer would provide a way to track the reduction in electricity saved and compute the total savings that is available to give back to the Grid. The Optimizer gives the user tools to save additional energy usage by using sensors to communicate and signal to idle appliances/equipment by turning them off or putting them into a low-energy mode after a certain time and at specified times of the day. The impact of energy efficiency on peak demand would depend on when the appliance/equipment is used. For example, an air conditioner uses more energy during the afternoon when it is hot. Therefore, an energy efficient air conditioner will have a larger impact on peak demand than off-peak demand as opposed to an energy efficient dishwasher which uses more energy during the late evening when people do their dishes.

The Optimizer provides two-way communication portal that gives the owner the ability to set controls based on desired outcomes. A building's location and surroundings play a key role in regulating its temperature and illumination. The Optimizer takes the building's location and/or environment into account when making recommendations to the user. The energy optimizer also has the ability to utilize virtual programming to evaluate what-if scenarios of upgrading systems, lighting, bulbs, and location usage that turns the data into usable information that give scaled estimated results based on levels of change.

In another example, the one or more energy optimizer devices and/or systems may allow a first energy customer (e.g., Ty Pivot Pro) who has equipment that is 15 years old and is rated below the current efficiency ratings to see one or more energy options. They recently registered their Energy equipment on the Optimizer and has chosen to participate in the automatic alerts program. The Optimizer recognizes (e.g., via voltage signals, electrical signal, energy profile analysis, equipment profile analysis, etc.) that Ty Pivot Pro's HVAC system is operating inefficiently and sends performance notifications to inform them of the loss savings. The Optimizer also sends recommendations for upgrades along with the amount of increased efficiency that would be attained. The Optimizer aligns any rebates offered by the Utility and notifies Ty Pivot Pro of those available to them.

In FIG. 12, an illustration of a standby generator screen 1200 is shown, according to one embodiment. In this example, a program screen has been utilized and a single program (e.g., standby generator) has been selected. In this example, a first highlighted box 1202 shows that a single program has been selected 1204 which is indicated by a checked area 1206 (e.g., standby generator). Further, once at least one program is selected a second highlighted box 1208 becomes active. In this example, the second highlighted box 1208 shows a first option 1210 (e.g., scheduling function) and a second option 1212 (e.g., a start now function). If the scheduling function is selected, then the client may enter a start time for one or more generators to produce power and an ending time for one or more generators to stop producing power. In addition, if the start now function is selected, then the client may initiate one or more generators to start producing power right now. If the start now function is selected, a stop now function may appear and/or the one or more generators may stop producing power after a predetermined time period has elapsed and/or a schedule stopping time.

In another example, the one or more energy optimizer devices and/or systems may allow customers to take full advantage of the "Energy Cloud" by monetizing their energy assets and obtain real time energy reports. In another example, the one or more energy optimizer devices and/or systems may provide the Utility company and/or end-use customers with quick access to customer-side energy resources to help heal the grid.

In another example, the one or more energy optimizer devices and/or systems may allow the Facility Manager at XYZ Hospital to respond to alerts she/he received from ABC Utility to switch to battery power because the electric grid is constrained. The Facility Manager can send a quick notice back to the Utility informing them they are having problems with the battery power, but they are able to reduce the lighting load to make up for their installed capacity commitment. This communication is fast because the Facility Manager is able to respond through her/his vehicle telematics, on her wearable device, her computer in her office, her mobile device, the demand response optimizer application, and various other methods within seconds of notification.

In another example, the one or more energy optimizer devices and/or systems may allow a large industrial or commercial customer to automate its participation in the demand response program by registering its installed capacity (energy-using equipment) with the COI Energy Optimizer. By the click of a button in the COI Optimizer, the industrial/commercial customer can make its capacity available to the Utility Company and/or Grid Operator by automatically curtailing pre-specified load or by automatically turning on its backup generator (BUG). This enables quick participation in programs like capacity, ancillary services, regulation, energy and others.

In another example, the one or more energy optimizer devices and/or systems may allow for the capturing of meter data. The one or more energy optimizer devices and/or systems can predict high bills weeks and/or energy usage before they hit—and help end-use customers get on track for lower ones. The Utility can deploy a large, opt-out program to forecast high bills and deliver personalized customer alerts combined with continuous support. In one example, the high energy usage may be an indication that a maintenance issue with one or more pieces of equipment is present.

In FIG. 13, an illustration of a pending authorization request database 1300 is shown, according to one embodiment. In this example, the pending authorization request database 1300 includes a program name area 1302, a program type area 1304, an account name area 1306, an account number area 1308, a device type area 1310, a view documents area 1312, and an action area 1314. In one example, the program is a demand response program and the program type is a backup generator. In this example, ABC groceries has a device type of a standby generator and has approved this standby generator being part of the program. Therefore, one or more standby generator alerts may be sent via the one or more energy optimizer devices to this energy user. In another example, ABC Bakeries has approved an energy efficiency program to have new chillers installed. Therefore, one or more rebates/installation alerts may be sent via the one or more energy optimizer devices to this energy user. Further, ABC Bakeries wants to participate in the renewable energy program and has selected wind as the source of renewable energy that ABC Bakeries wants to purchase. Therefore, one or more wind energy alerts may be sent via the one or more energy optimizer devices to this energy user.

Figure 14:
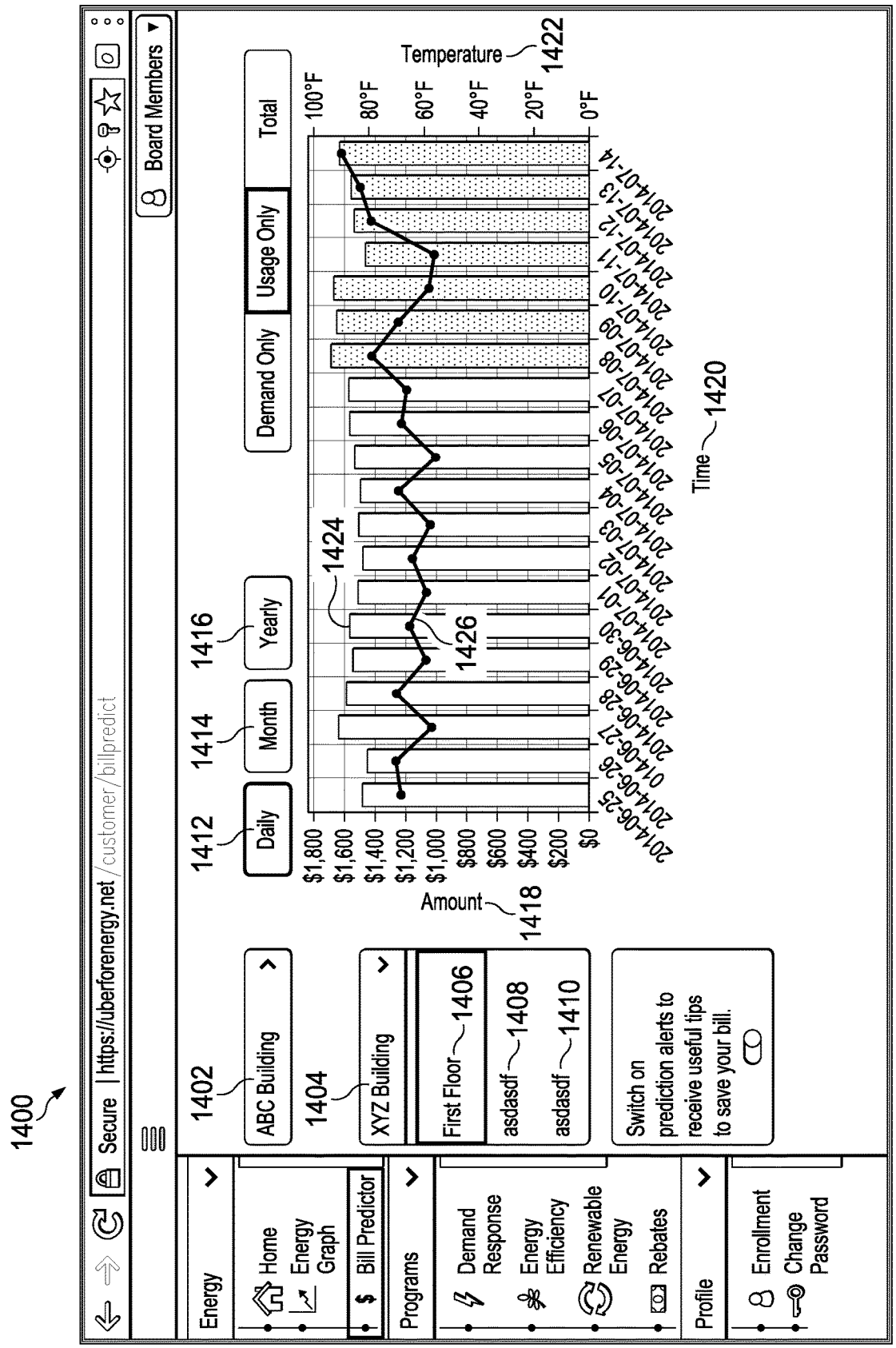
FIG. 14 is another illustration of an energy usage, according to one embodiment.

In FIG. 14, another illustration of energy usage is shown, according to one embodiment. In this example, a second energy usage screen 1400 includes a first site 1402 (e.g., ABC Building) and an Nth site 1404 (e.g., XYZ Building). In this example, the Nth site 1404 may be expanded to include a first site area 1406 (e.g., First Floor), a second site area 1408 (e.g., Second Floor), and an nth site area 1410 (e.g., a second building structure—water treatment site). Further, a first time period 1412 (e.g., daily), a second time period 1414 (e.g., monthly), and/or an Nth time period 1416 (yearly) may be utilized to analyze the energy usage for the total site (e.g., Nth site 1404) and/or one or more sections (e.g., a first site area 1406, a second site area 1408, and/or an nth site area 1410). In addition, a graph may include an amount axis 1418 (e.g., cost), a time axis 1420, and an environmental axis 1422 (e.g., temperature). This graph may include an actual billing amount 1424 and a projected billing amount 1426. Any difference between the actual billing amount 1424 and the projected billing amount 1426 may indicate an opportunity for energy conservation, equipment maintenance request, and/or management. Examples of these would be energy efficiency projects, shopping for a better price, capacity management, peak shaving, load shifting, equipment maintenance request, etc.

Figure 15:
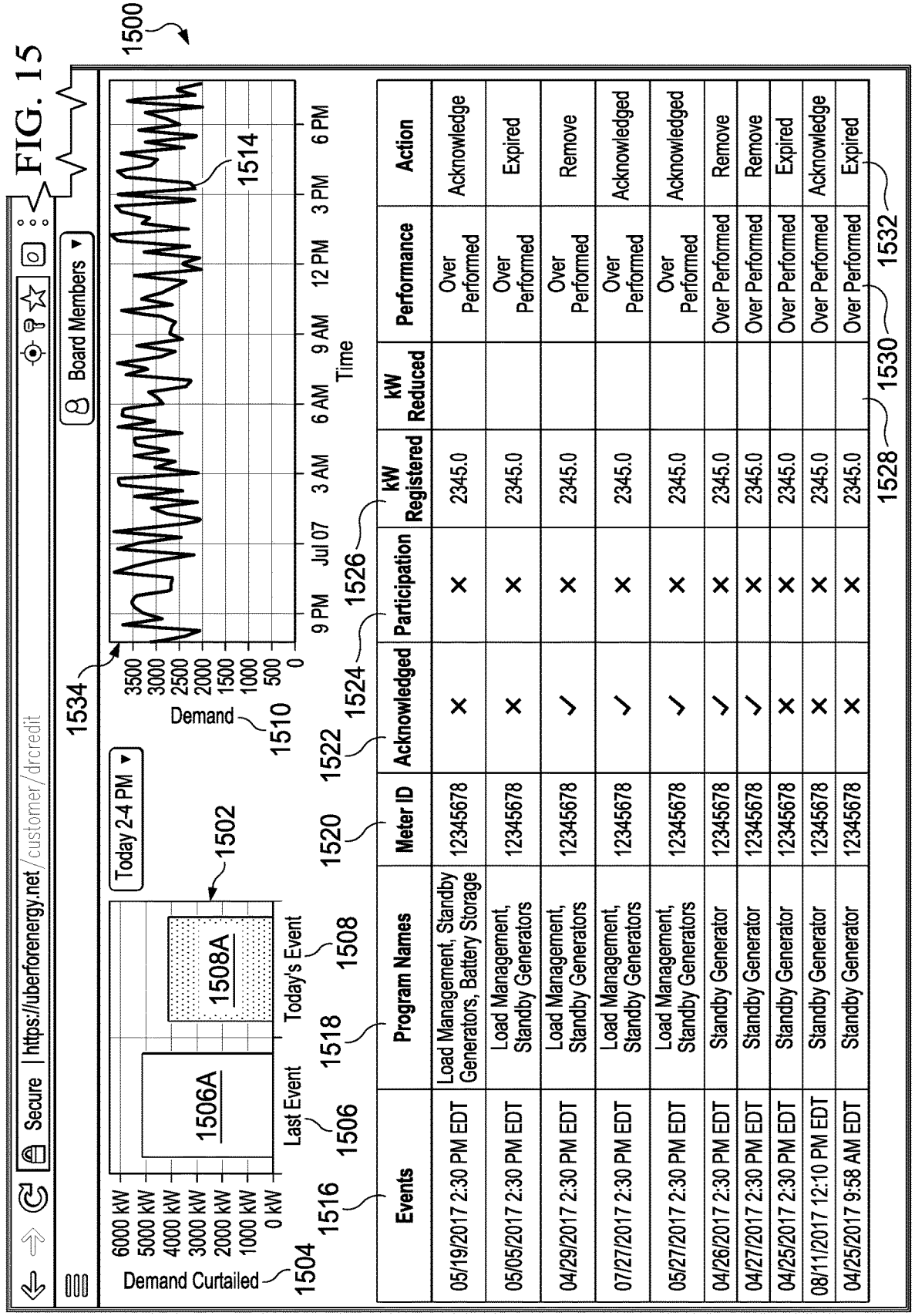
FIG. 15 is an illustration of a customer profile, according to one embodiment.

In FIG. 15, an illustration of customer profile screen 1500 is shown, according to one embodiment. In this example, the customer profile screen 1500 includes a demand curtailment chart 1502. The demand curtailment chart 1502 includes a demand axis 1504 and a time axis with a first time event 1506 (e.g., last event) and a second time event 1508 (e.g., today's event). In this example, during the first time event 1506 a first peak capacity demand 1506A of a little over 5,000 kW was achieved. Whereas, during the second time event 1508 a second peak capacity demand 1508A of a little over 4,000 kW was achieved. Therefore, a reduction in capacity demand from the first time event 1506 to the second time event 1508 of approximately 1,000 kW was achieved— due to load management, battery power, generator power, and/or any combination thereof. In this example, a daily demand chart 1534 shows the demand profile 1514 for the time period measured on a demand axis 1510 and a time axis 1512. Further, an event area 1516, a program type area 1518, a meter identification area 1520, an acknowledged area 1522, a participation area 1524, a kW registered area 1526, a kW reduction area 1528, a performance area 1530, and an actions area 1532 may be utilized with these events. For example, if a client approved and/or acknowledged the load reduction program before it—an indication of such would be shown in the acknowledged area 1522. If the customer participated in the load reduction program, this would be shown in the participation area 1530. In addition, the kW registered area 1526 would indicate how much of a load reduction the client committed to which can be compared to the number in the kW reduction area 1528 which would lead to a performance rating in the performance area 1530.

Figure 16:
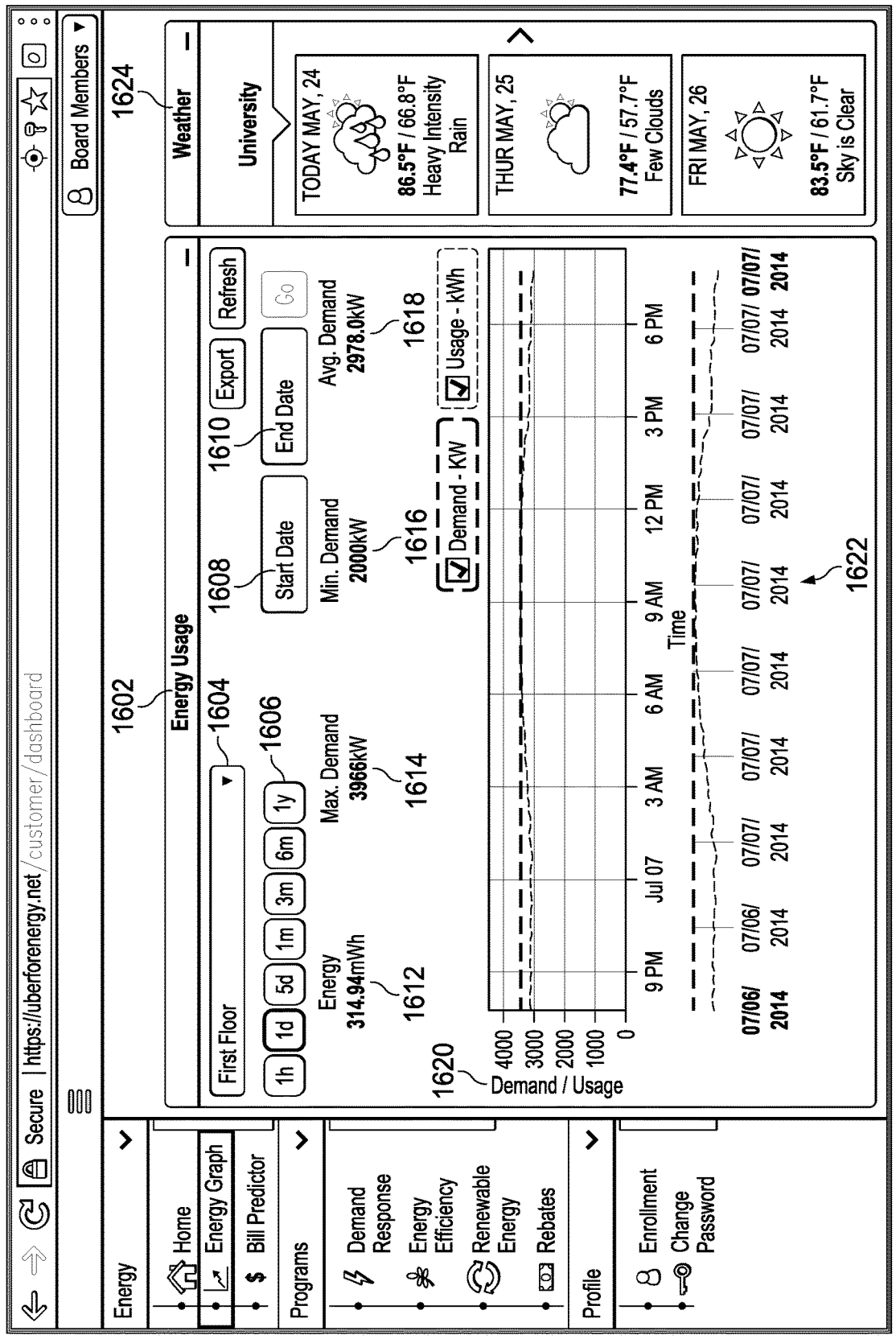
FIG. 16 is an illustration of a customer energy usage, according to one embodiment.

In FIG. 16, an illustration of customer energy usage screen 1600 is shown, according to one embodiment. In this example, the customer energy usage screen 1600 includes a title area 1602, a location 1604, one or more time periods 1606, a start time 1608, an end time 1610, an energy usage 1612, a maximum demand usage 1614, a minimum demand usage 1616, an average demand usage 1618, and an environmental table 1624. In this example, a demand/usage is plot against a time period utilizing a demand/usage axis 1620 and a time period axis 1622.

Figure 17:
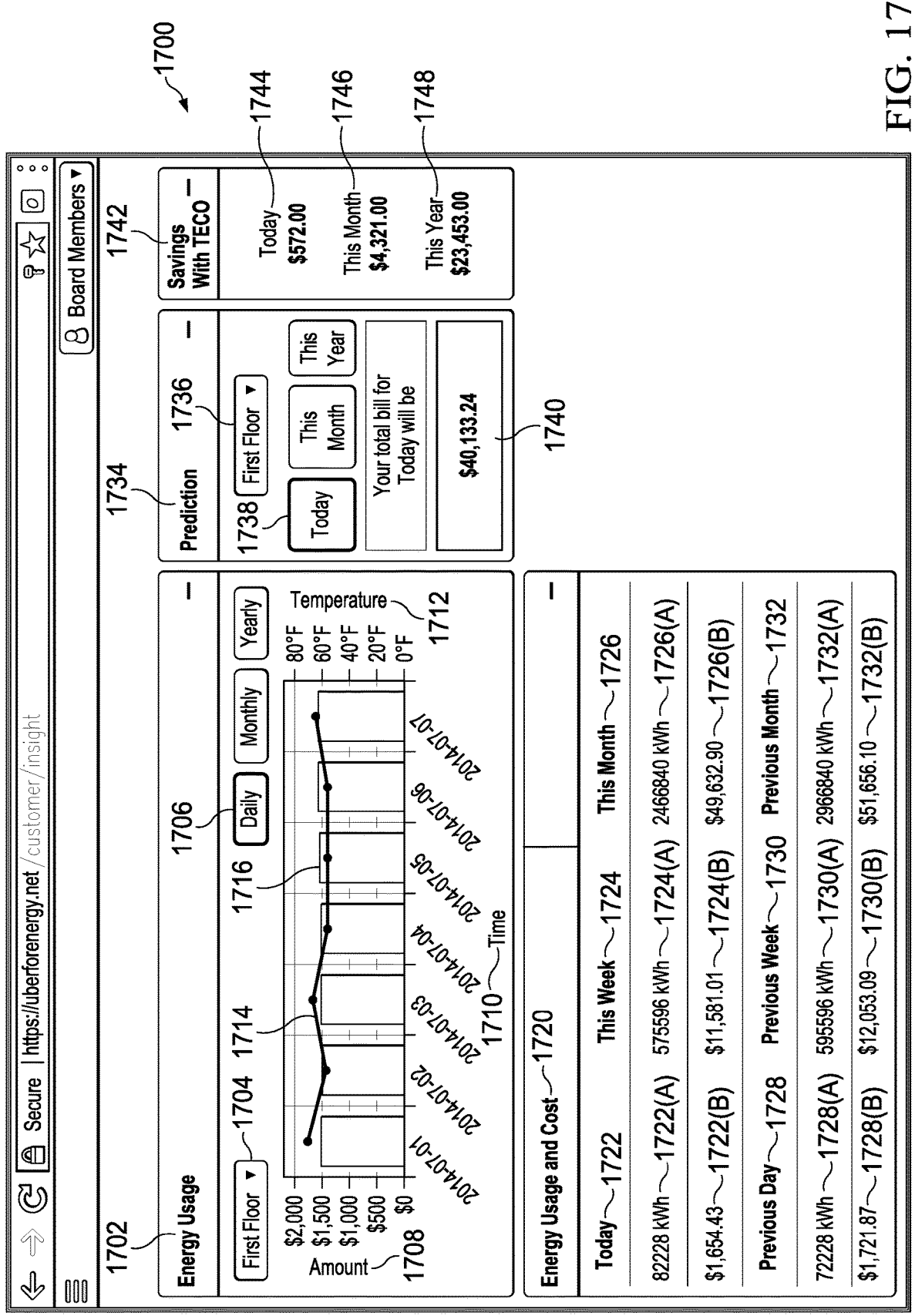
FIG. 17 is another illustration of a customer energy usage, according to one embodiment.

In FIG. 17, another illustration of customer energy usage is shown, according to one embodiment. A customer energy usage screen 1700 may include an energy usage box 1702. The energy usage box 1702 may include an area indicator 1704 and/or one or more time periods 1706. Further, an energy usage graph with an amount axis 1708, a time axis 1710, and an environmental element axis 1712 may show an estimated energy usage cost 1714 and an actual energy usage cost 1716. In addition, an energy usage and cost box 1720 may include a first time period 1722, a second time period 1724, a third time period 1726, a fourth time period 1728, a fifth time period 1730, and an Nth time period 1732. In this example, the first time period 1722 (e.g., today) has a first energy usage 1722A and a first energy usage cost 17226 associated with the first time period 1722. In this example, the second time period 1724 (e.g., this week) has a second energy usage 1724A and a second energy usage cost 1724B associated with the second time period 1724B. In this example, the third time period 1726 (e.g., this month) has a third energy usage 1726A and a third energy usage cost 1726B associated with the third time period 1726. In this example, the fourth period 1728 (e.g., previous day) has a fourth energy usage 1728A and a fourth energy usage cost 17286 associated with the fourth time period 1728. In this example, the fifth time period 1730 (e.g., previous week) has a fifth energy usage 1730A and a fifth energy usage cost 17306 associated with the fifth time period 1730. In this example, the nth time period 1732 (e.g., previous month) has an nth energy usage 1732A and an nth energy usage cost 17326 associated with the nth time period 1732. In addition, a prediction box 1734 may include a first area 1736 (where the prediction is being made), one or more time periods 1738 (the time period where the prediction is being made), and a predicted cost 1740 (e.g., $40,133.24). Further, a saving box 1742 shows the amount of money saved during a first time period 1744, a second time period 1746, and an nth time period 1748.

In another example, the one or more energy optimizer devices and/or systems may provide the Utility company and end-use customers with quick access to customer-side renewable energy resources to help heal the grid. Through the COI Smart Meter technology and predictive analytics tool using machine learning techniques, the Utility is able to capture the available capacity in a specific area to address grid constraints.

In another example, the one or more energy optimizer devices and/or systems may allow end-use customers to sell their excess capacity to other energy users, the grid operator, utility company, industrial, commercial, municipal, and/or residential energy users by receiving alerts on who wants to buy Renewable Energy Credits (RECs) or needs extra capacity.

Figure 18:
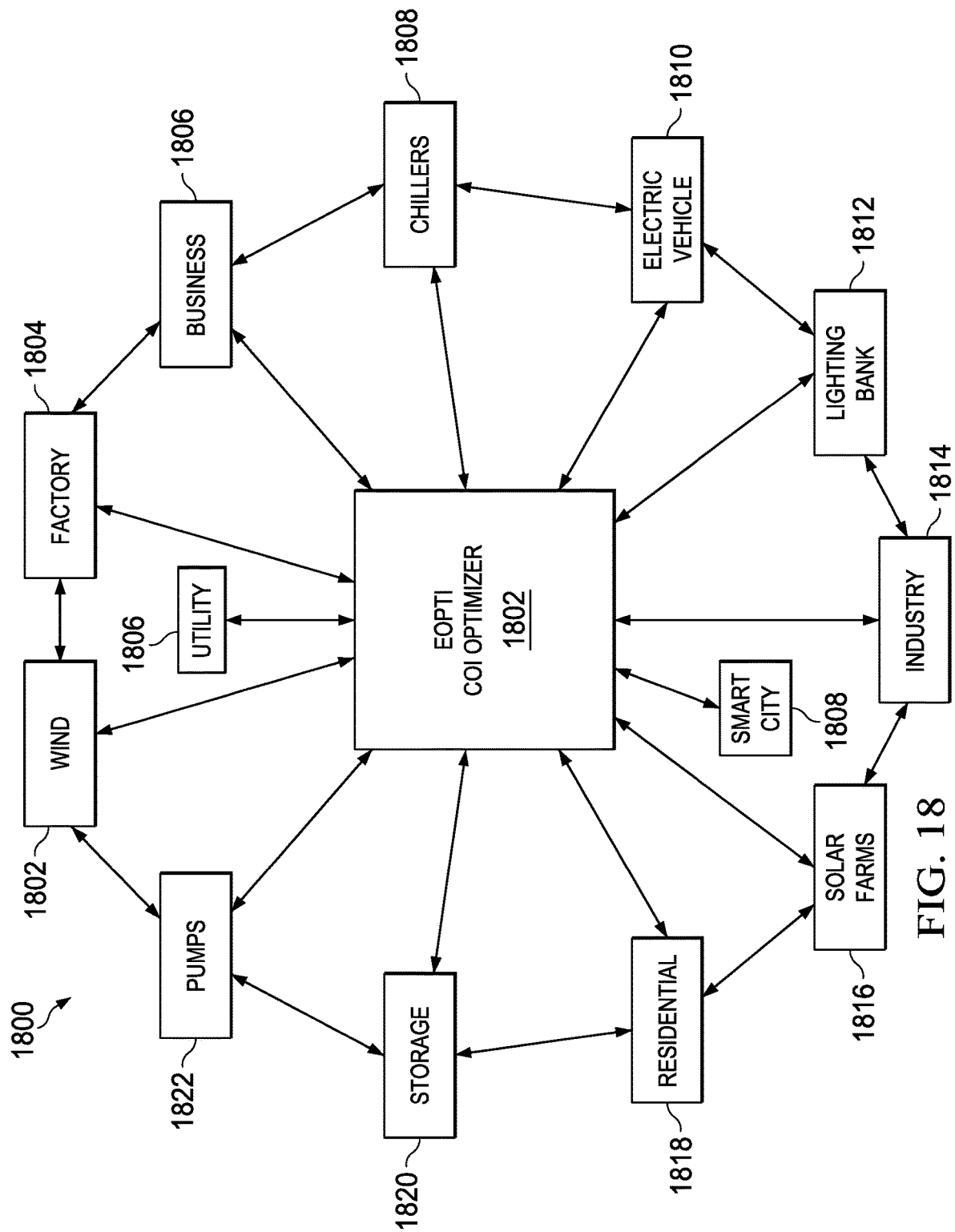
FIG. 18 is an illustration of the utilization of the energy optimizer, according to one embodiment.

In FIG. 18, an illustration of an optimizer is shown. In one example, a COI Optimizer 1802 may provide one or more communication links to one or more smart cities 1808, one or more energy providers 1806, one or more wind sites 1802 (e.g., a first energy providing device), one or more factories 1804 (e.g., a first energy customer), one or more businesses 1806 (e.g., a second energy customer), one or more chillers 1808 (e.g., a first energy device), one or more electric vehicles 1810 (e.g., a second energy device), one or more lighting banks 1812 (e.g., a third energy device), one or more industrial customers 1814 (e.g., a third energy customer), one or more solar farms 1816 (e.g., a second energy providing device), one or more residential customers 1818 (e.g., an Nth energy customers), one or more storage units 1820 (e.g., a first energy providing device), one or more pumps 1822 (e.g., an Nth electrical device). In various examples, any energy customer, any energy provider, any smart city, any energy device, any energy providing device, and/or any other device may communicate with each other. These communicates may be facilitated via the COI Optimizer 1802.

In one example, one or more energy optimizer devices and/or one or more energy optimizer systems working through a central energy optimizer hub. The one or more energy optimizer devices and/or one or more energy optimizer systems working through the central energy optimizer hub may provide two way communications between one or more energy providers, one or more smart cities, and/or one or more energy users. In this example, the one or more energy optimizer devices and/or one or more energy optimizer systems working through the central energy optimizer hub may provide two way communications between the one or more smart cities and its community members (e.g., businesses, residents, resources, etc.). In this example, one or more energy users may communicate with each other via the one or more energy optimizer devices and/or one or more energy optimizer systems working through the central energy optimizer hub.

Figure 19:
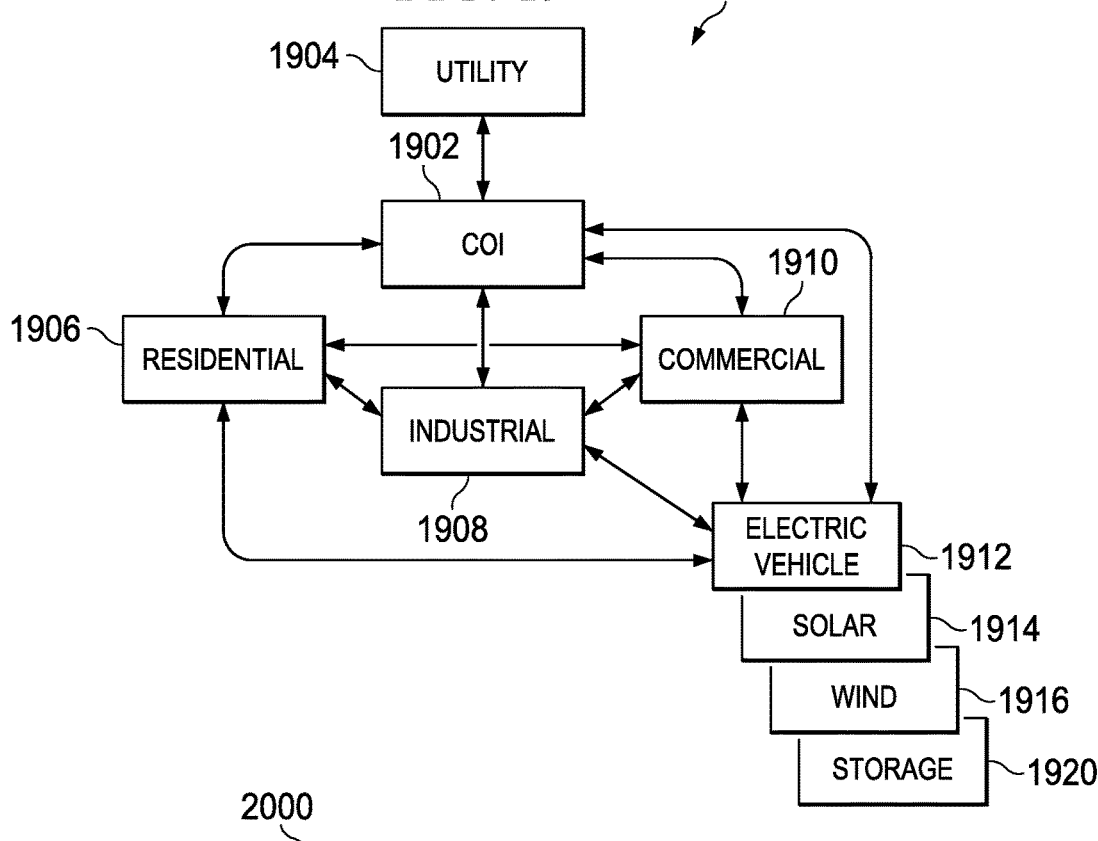
FIG. 19 is another illustration of the utilization of the energy optimizer, according to one embodiment.

In FIG. 19, a second illustration 1900 of the utilization of the energy optimizer is shown, according to one embodiment. The second illustration 1900 shows one or more energy providers 1904 utilizing one or more energy optimizer devices and/or one or more energy optimizer systems working through the central energy optimizer hub 1902 to communicate and/or learning about one or more residential customers 1906, one or more industrial customers 1908, and one or more commercial customers 1910. In this example, the one or more energy providers 1904, the one or more residential customers 1906, the one or more industrial customers 1908, and the one or more commercial customers 1910 may trade one or more of electric vehicle units 1912 (e.g., and/or electric vehicle credits), one or more solar energy units 1914 (e.g., and/or solar energy credits), one or more wind energy units 1916 (e.g., and/or wind energy credits), one or more storage energy units 1920 (e.g., and/or storage energy credits), one or more energy capacity (e.g., and/or energy capacity credits), and/or environmental emission units (e.g., and/or environmental emission credits).

Figure 20:
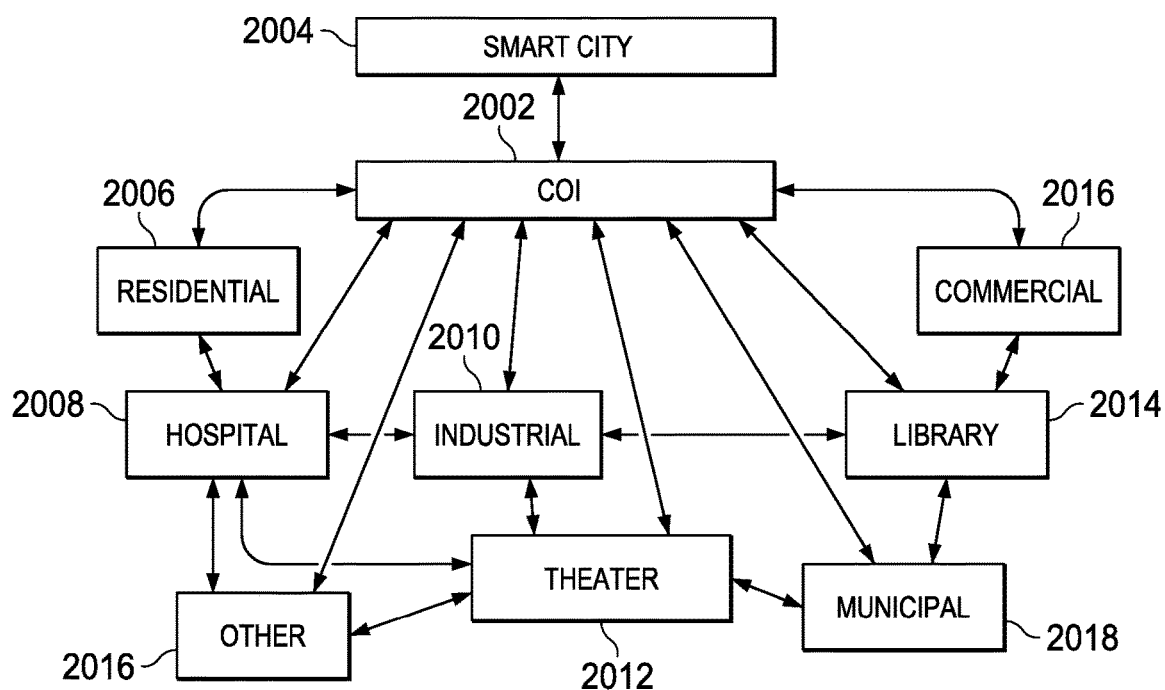
FIG. 20 is another illustration of the utilization of the energy optimizer, according to one embodiment.

In FIG. 20, a third illustration 2000 of the utilization of the energy optimizer is shown, according to one embodiment. The third illustration 2000 shows one or more smart cities 2004 utilizing one or more energy optimizer devices and/or one or more energy optimizer systems working through the central energy optimizer hub 2002 to communicate with one or more residential energy users 2006, one or more commercial energy users 2016, one or more industrial energy users 2010, one or more hospitals 2008, one or more libraries 2014, one or more theater 2012, one or more municipal locations 2018, and/or any other location 2016. In various examples, the alerts and/or trading may relate to: capacity for purchase; capacity for sale; capacity requests; emergency room wait time; other customer specific availability (e.g., restaurants, movies, shows, ballgame, etc.), library functions; community functions; clean energy availability; clean energy needs; electric vehicle charging stations' locations and/or availability; nearest electric vehicle charging station, etc.

In one example, the one or more energy optimizer devices and/or systems may use Smart Cities optimizer to provide Utilities (Electric, Gas, Water, etc.), Fragmented Communities, Consumers, Businesses, Attractions, Healthy Living Resources, Devices/Equipment, Alternative Transportation (car sharing, bike sharing, walk sharing, etc.), Energy Storage, Community Resources and other resources the glue to make the cities thrive. It is the information hub for all things energy, community, social, personal and business. Through The Optimizer, Smart Cities are able to stay connected with the latest alerts on trading opportunities amongst Consumers, Business to Business, Business to Consumer, Utility to Consumer, and more.

For Example 1, Through Smart Cities optimizer, Smart Cities are able to show business to business energy capacity that is available to buy or sell. Another business can purchase directly from another business in addition to with the utility. Also, consumers can purchase from businesses or other consumers. It is a dynamic market place of energy trading for meeting capacity needs, renewable energy needs, etc.

For Example 2, Through Smart Cities optimizer, Smart Cities can provide its residents with information pertinent to its interest. If a consumer wants to be Educated on how to become more energy efficient, he/she could click the Educate button to either connect with: another consumer who has been an innovative leader in this area, business that has led the way in energy efficiency, hear/read recent stories about such accomplishments, etc. The Empower and Impact button serves a similar purpose.

For Example 3, a resident wants to find out what community events are happening today for dogs. She is able to do a search on events in community for pets or specifically for dogs. She will immediately see all local happenings in the area she is located. Or she could set up an alert to have all events related to dogs pushed to her on a daily, weekly, etc. basis.

Figure 21:
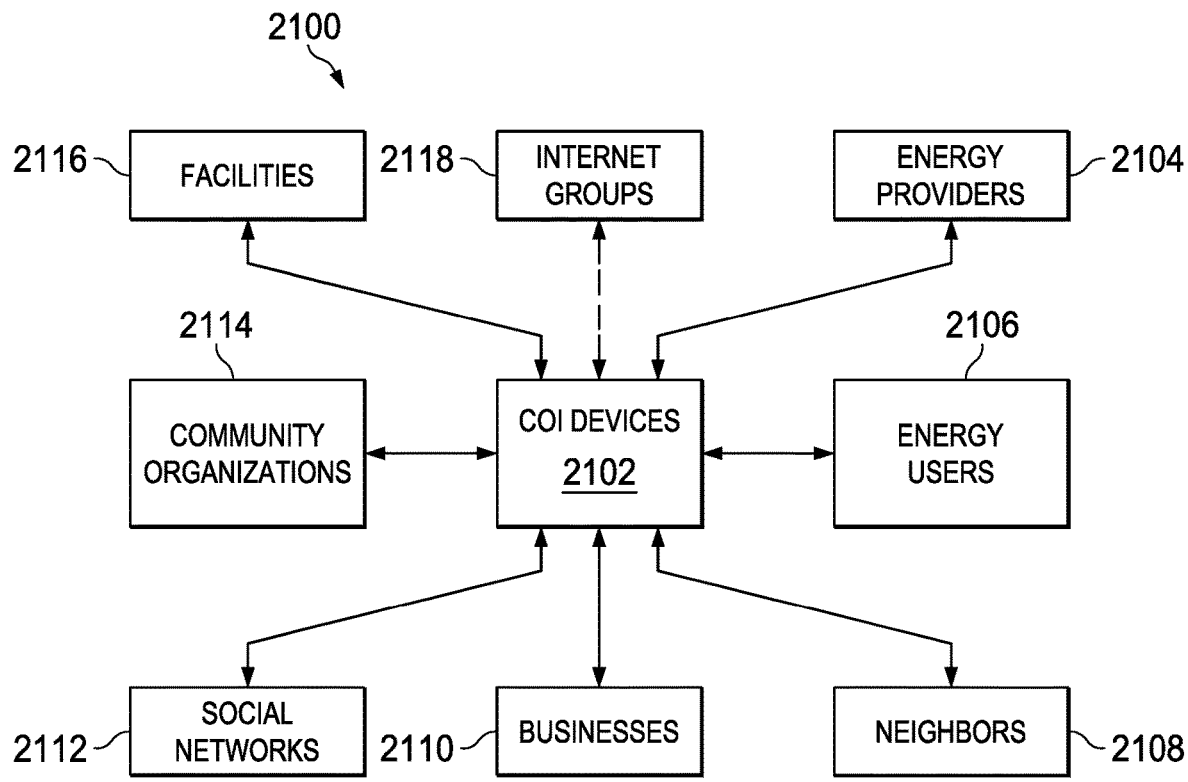
FIG. 21 is another illustration of the utilization of the energy optimizer, according to one embodiment.

In FIG. 21, another illustration of the utilization of the energy optimizer is shown, according to one embodiment. In this example, an energy optimizer device 2102 is connected to one or more energy provides 2104, one or more energy users 2106, one or more neighbors 2108, one or more businesses 2110, one or more social networks 2112, one or more community organizers 2114, one or more facilities 2116, and/or one or more interest groups 2118. In one example, a first neighbor may purchases energy and/or excess capacity from a second neighbor via the energy optimizer device 2102 with and/or without going through an energy provider. In another example, a first energy user may learn tips (e.g., energy educational tips) from a second energy user. In another example, one or more community events (e.g., energy efficiency seminars, cook out, etc.) may be communicated to one or more parties via the energy optimizer device 2102. In another example, a first business may join one or more other businesses to buy their power in bulk.

Figure 22:
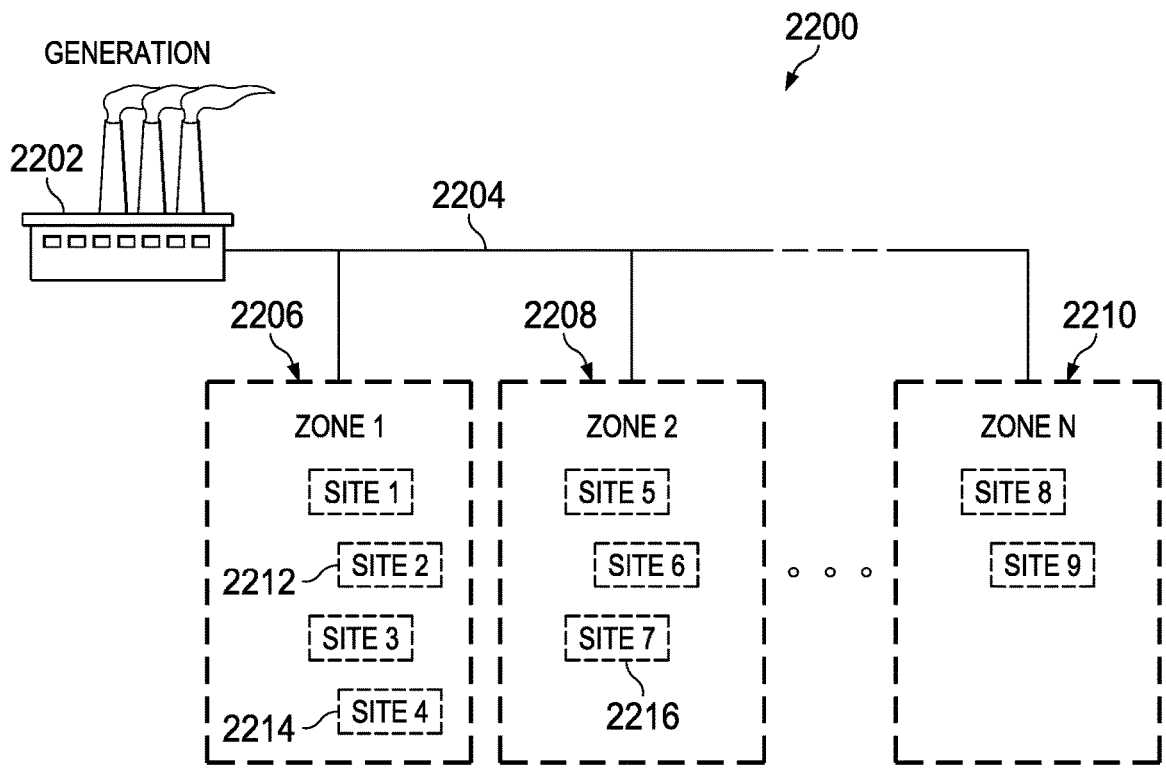
FIG. 22 is an illustration of utilizing the energy optimizer to repair one or more sections of an energy grid, according to one embodiment.

In FIG. 22, an illustration of utilizing the energy optimizer to repair one or more sections of the grid is shown, according to one embodiment. In this example, an electrical grid 2200 includes one or more generating sites 2202, one or more transmission/distribution lines 2204, a first grid zone 2206, a second grid zone 2208, and an nth grid zone 2210. The first grid zone 2206 includes a first group of sites (e.g., a site 1, a site 2, a site 3, and a site 4). The second grid zone 2208 includes a second group of sites (e.g., a site 5, a site 6, and a site 7). The nth grid zone 2210 includes an nth group of sites (e.g., a site 8 and a site 9). In one example, the first grid zone 2206 is experiencing a power situation (e.g., voltage problem, etc.). Since the utility knows the equipment at all the sites in the first group of sites via one or more energy optimizer device, the utility utilizes equipment at a first site 2212 and a second site 2214 located with the first grid zone 2206 to reveal the problem in the first grid zone 2206. In one example, a backup generator at the first site 2212 was utilized and a battery bank at the second site 2214 was utilized. In another example, a situation with the second grid zone 2208 has occurred which can be handled by the equipment at a third site 2216. In this example, the third site included a cogeneration operation, backup generators, battery units, and solar storage where one or more of these devices are used to solve one or more problems.

Figure 23:
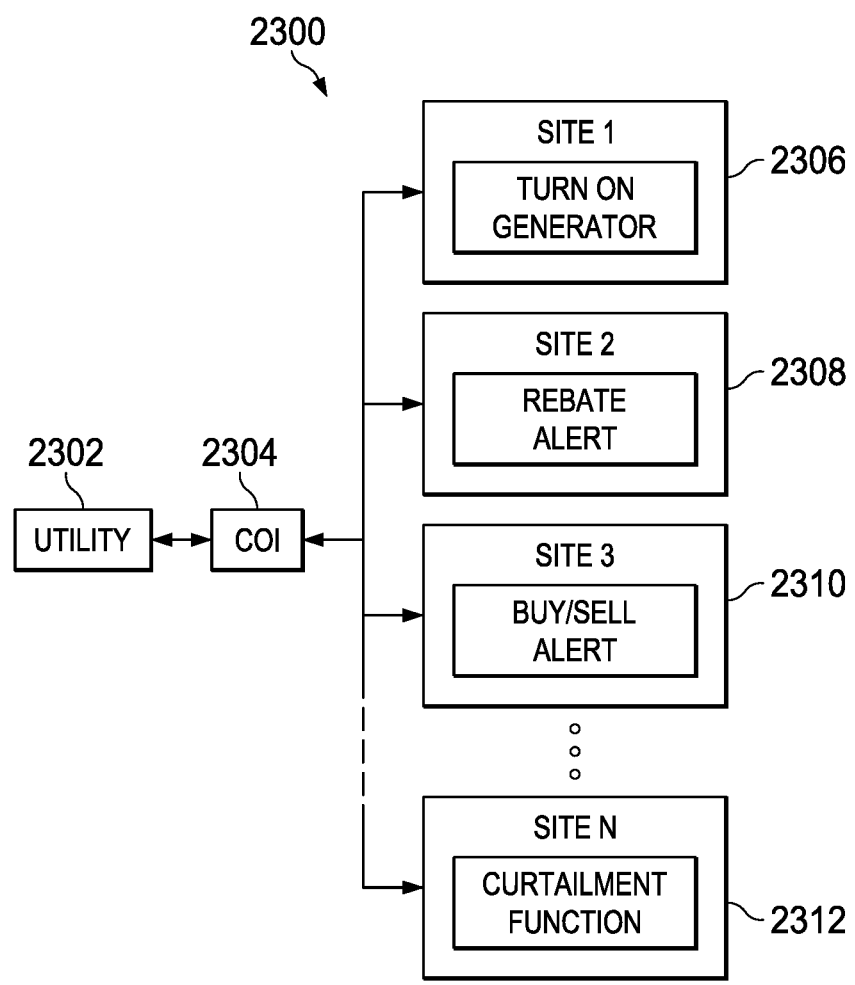
FIG. 23 is an illustration of one or more energy optimizer functionalities, according to one embodiment.

In FIG. 23, an illustration of one or more energy optimizer functionalities is shown, according to one embodiment. In one example, an energy system 2300 may include one or more utilities 2302, one or more energy optimizer systems 2304, a first site 2306, a second site 2308, a third site 2310, and an Nth site 2312. In one example, the first site 2306 receives an alert from at least one of the one or more utilities 2302 and/or at least one of the one or more energy optimizer systems 2304 requesting that the one or more generators at the first site 2306 be turned on. Based on this alert, one or more generators at the first site 2306 are turned on for a first time period. In another example, the second site 2308 receives an alert from at least one of the one or more utilities 2302 and/or at least one of the one or more energy optimizer systems 2304 regarding a rebate to replace inefficient equipment (e.g., lighting, motors, HVAC). Based on this alert, the second site 2308 may order the equipment, request more information, request a call from their utility and/or energy optimizer representation, and/or acknowledge the alert. In another example, the third site 2310 receives an alert from at least one of the one or more utilities 2302 and/or at least one of the one or more energy optimizer systems 2304 regarding an energy price buy/sell signal. Based on this alert, the third site 2310 may buy and/or sell energy on the retail market, the wholesale market, start up one or more energy equipment (e.g., cogenerators, generators, battery units, etc.), shut down one or more energy equipment (e.g., lights, motors, etc.), and/or any combination thereof. In another example, the Nth site 2312 receives an alert from at least one of the one or more utilities 2302 and/or at least one of the one or more energy optimizer systems 2304 regarding a curtailment function. Based on this alert, the Nth site 2312 may start up one or more energy equipment (e.g., cogenerators, generators, battery units, etc.), shut down one or more energy equipment (e.g., lights, motors, etc.), and/or any combination thereof.

In another example, the one or more energy optimizer devices and/or systems may via an Information Alerts optimize may allow a residential, commercial and/or industrial customer to enroll its energy-using assets with the COI Optimizer which will enable them to receive alerts regarding energy efficiency programs and rebates available to them based on the type, age and function of equipment in their premise. In addition, customers can select their preferences and receive alerts on new technology incentives, renewable energy incentives, and demand response incentives. The alerts only provide the specific customer with information pertinent to their needs.

For Example, Bob registered his equipment on The Optimizer Facility Management Equipment Inventory System. He then turns the notifications function which enables notifications of programs and rebates available to him by his Utility Company, smart city, the energy optimizer organization, and/or State. He gets an alert that informs him that his company qualifies for the following rebates: rooftop solar system, variable frequency drives, and/or chiller replacement. He selects the rebates that provide the best return of investment option for his company and clicks to apply. In addition, he receives a notification that his company could reduce its energy consumption by 5-15% if they install an additive to its chiller system. He also applies to have an assessment done on his chiller system to see if it makes more sense to purchase the additive or utilize the rebate to replace the unit. Bob, receives an estimated return of investment option for the rebates and products he selected to pursue via the one or more energy optimizer devices and/or systems. This estimate was provided directly to Bob from The Optimizer application.

For Example 2, an end-use customer receives an alert that it is eligible for various programs offered by its Utility Company via the one or more energy optimizer devices and/or systems. They can click on the alert and immediately enroll in Utility program utilizing one of the two-way communication methods offered by the demand response optimizer.

For Example 3, XYZ Utility Company can use The Optimizer to provide Power Outage Alerts. The Utility will send alerts directly through the Application giving the customer timely information on planned and unplanned outages. It enables customer to plan around the outage to protect their assets. The Utility can provide how long the system will be down and when to expect it to be fully functional again. The Customer is also able to notify Utility of an outage in their neighborhood. This helps the Utility to more quickly identify problems and solve them. This two-way communication portal helps improve customer satisfaction by easing the customer's frustrations of not knowing what is going on and provides an opportunity for them to plan around the outages.

Figure 24:
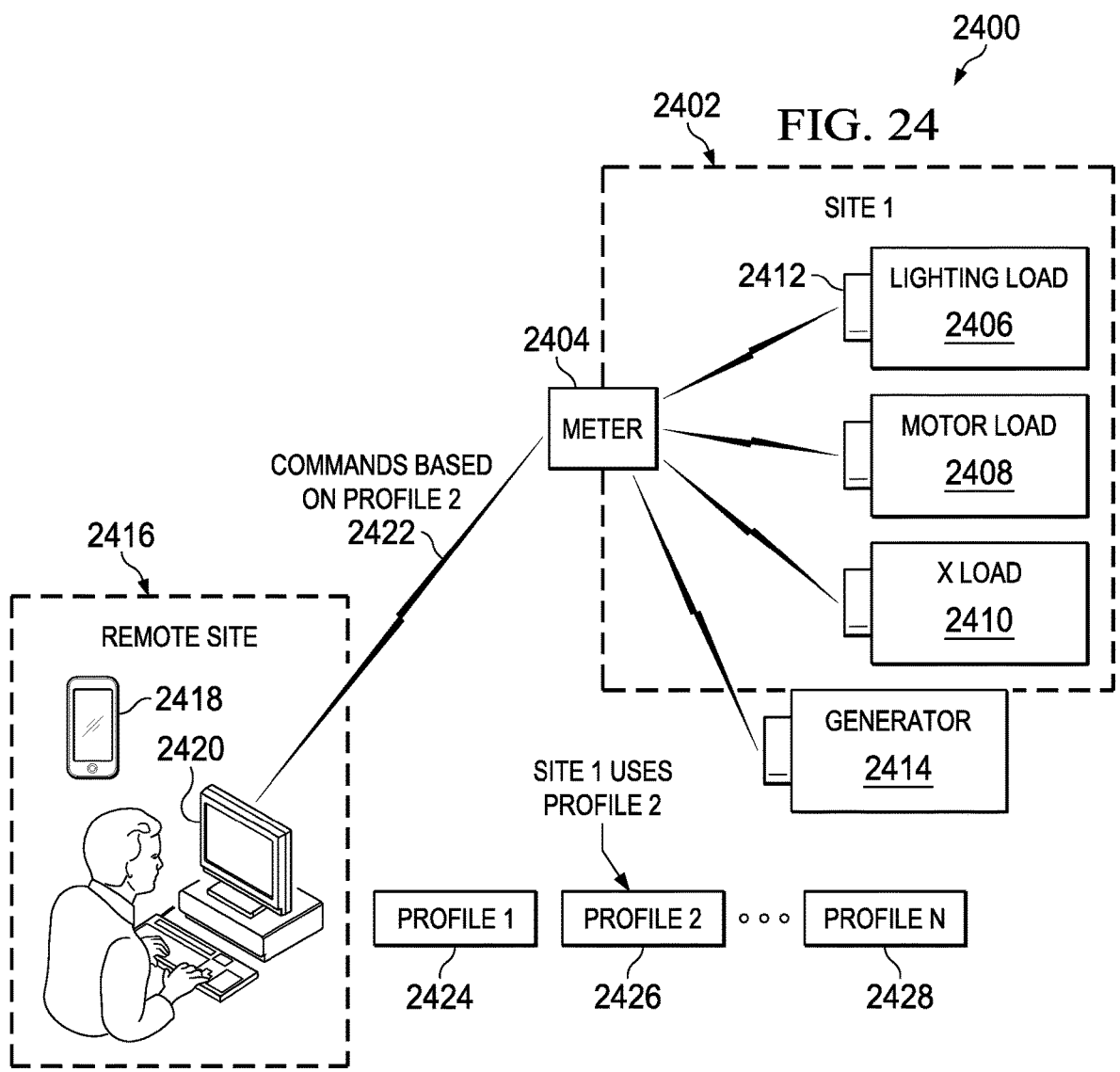
FIG. 24 is another illustration of one or more energy optimizer functionalities, according to one embodiment.

In FIG. 24, another illustration of one or more energy optimizer functionalities is shown, according to one embodiment. In one example, a smart site diagram 2400 may include a first smart site 2402 and a remote site 2416. In this example, the first smart site 2402 may include a meter 2404 which may have one or more control functionalities. Further, the first smart site 2402 may include a first energy load 2406 (e.g., lighting load), a second energy load 2408 (e.g., motor load), an Nth energy load 2410 (e.g., X load), and/or a generator 2414. The first energy load 2406, the second energy load 2408, the Nth energy load 2410, and the generator 2414 may include one or more smart control devices 2412. Where the one or more smart control devices 2412 may communicate with the meter 2404, a first energy optimizer device 2418 (e.g., mobile phone), a second energy optimizer device 2420 (e.g., desktop), and/or any other electrical device to control (e.g., turn on, turn off, increase load, decrease load, and/or any combination thereof) the first energy load 2406, the second energy load 2408, the Nth energy load 2410, and the generator 2414. In addition, a first profile 2424, a second profile 2426, and an Nth profile 2428 may illustrate different energy usage profiles for different kinds of business. In one example, the second profile 2426 is being utilized to control the first smart site 2402. In another example, one or more signals from a first electric device shows a first data point which is above an energy profile for that first electric device which may indicate a performance breakdown (and/or maintenance requirement and/or end of useful life) that based on one or more data points being outside of an operating range a first condition has and/or is occurring. In another example, a reading below a first specific level indicates a first condition (e.g., end of life cycle) while a reading above a second specific level indicates a second condition (e.g., running inefficiently). In addition, one or more signals from beyond an electrical meter may be dissected (via one or more machine learning algorithms, one or more profiles, and/or one or more machine profiles) to determine that 40 percent of the load is from lighting, 30 percent is from HVAC load, 20 percent is from motor load, and with 10 percent coming from miscellaneous loads.

In one example, at the beginning of the energy optimizer process and/or the process in general, the first energy load 2412, the second energy load 2408, and/or the nth energy load 2410 may not be known. In other words, beyond the meter 2404 the profiles and/or energy sources (e.g., lighting load, motor load, etc.) for these various energy load is not known. However, using machine learning and/or energy usage profiles along with numerous and/or a plurality of data points obtained from the one or more smart control devices 2412, the energy source (e.g., lighting load, HVAC load, motor load, etc.) may be determined and shared with the one or more energy optimizer devices, the one or more energy optimizer systems, one or more smart cities, one or more utilities, one or more customers, and/or any combination thereof. The process of determining the load source may be completed in a first time frame (e.g., hours), a second time frame (e.g., days), and/or a third time frame (e.g., weeks).

Figure 25:
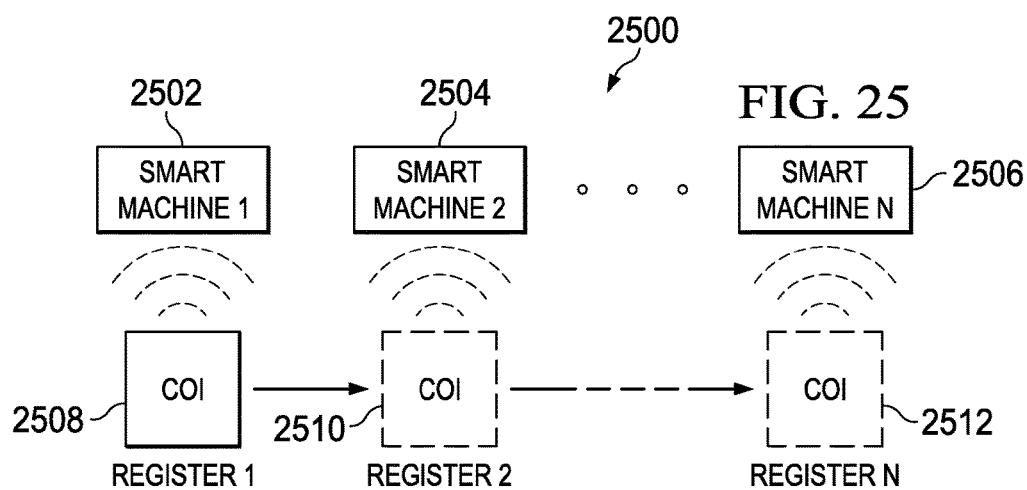
FIG. 25 is another illustration of one or more energy optimizer functionalities, according to one embodiment.

In FIG. 25, another illustration of one or more energy optimizer functionalities is shown, according to one embodiment. In this example, a smart device registration process 2500 includes one or more energy optimizer devices 2508 registering a first smart machine 2502 via a communication link (e.g., near field, radio-frequency, etc.). As the one or more energy optimizer devices 2508 comes into contact with a second smart machine 2504, the second smart machine 2504 is registered with one or more programs via one or more communication links (e.g., near field, radio-frequency, etc.)—the one or more energy optimizer devices 2508 moves to a second position 2510. In addition, as the one or more energy optimizer devices 2508 moves to an Nth position 2512, an Nth smart machine 2506 comes into contact with the one or more energy optimizer devices 2508 which registers the Nth smart machine 2506 into one or more energy programs.

Figure 26:
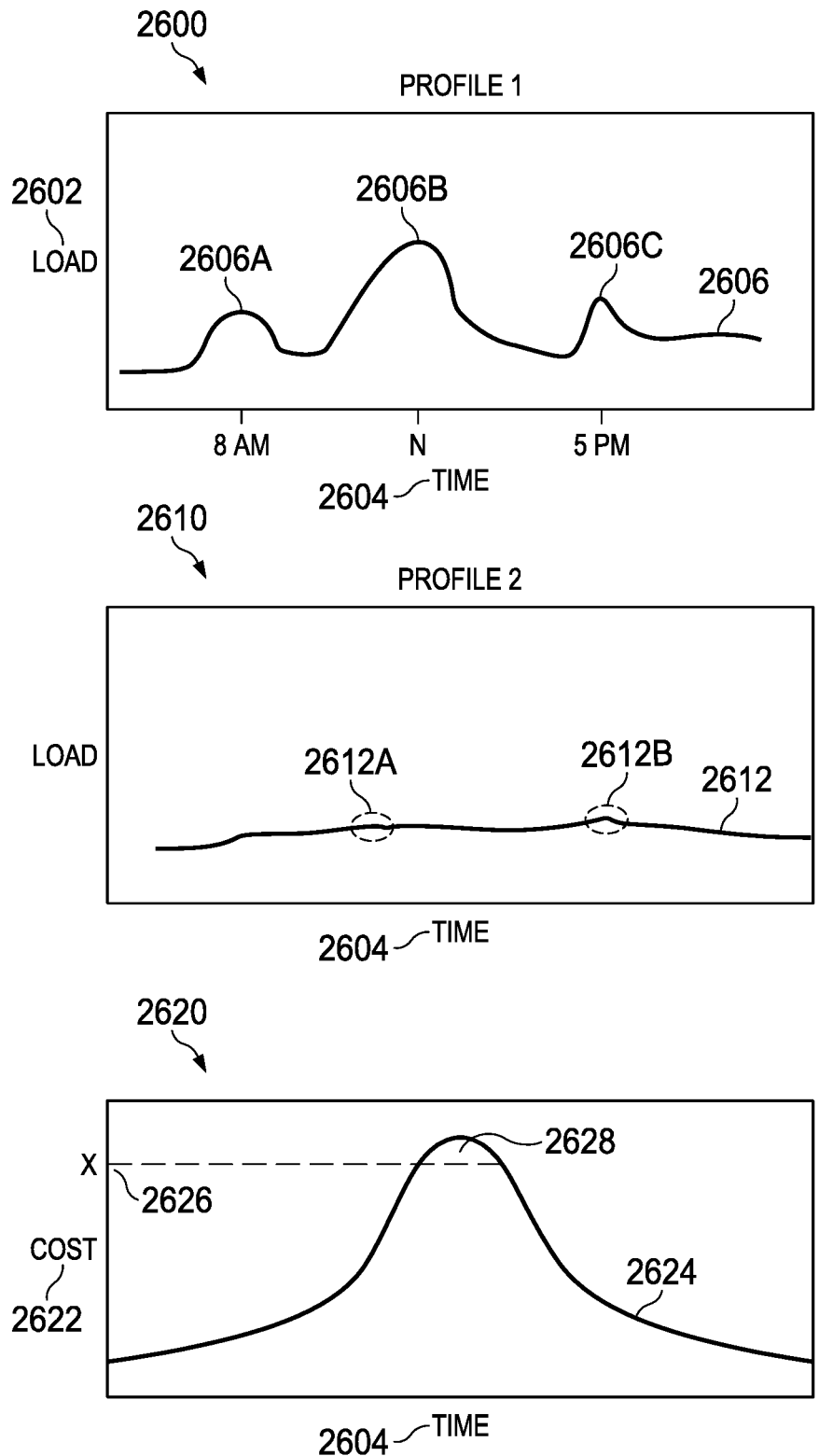
FIG. 26 is an illustration of one or more energy profiles, according to one embodiment.

In FIG. 26, an illustration of one or more energy profiles is shown, according to one embodiment. In one example, a first energy profile 2600 shows a first energy usage 2606 on a load axis 2602 and a time axis 2604. In this example, the first energy usage 2606 shows a first energy peak 2606A, a second energy peak 2606B, and an Nth energy peak 2606C. In this example, the first energy peak 2606A happens at 8 am. The second energy peak 2606B happens at noon while the Nth energy peak 2606C occurs at 5 pm. Further, a second energy profile 2610 shows a second energy usage 2612 where a first energy peak 2612A and a second energy peak 2612B are relatively shallow as compared to either the entire second energy usage 2612 and/or any peak from the first energy profile 2600. In addition, an energy cost diagram 2620 shows an energy cost curve 2624 which utilizes a cost axis 2622 and the time axis 2604. In this example, a first cost 2626 on the energy cost curve 2624 may trigger one or more actions by the client to eliminate the cost associate with a peak power cost 2628.

Figure 27:
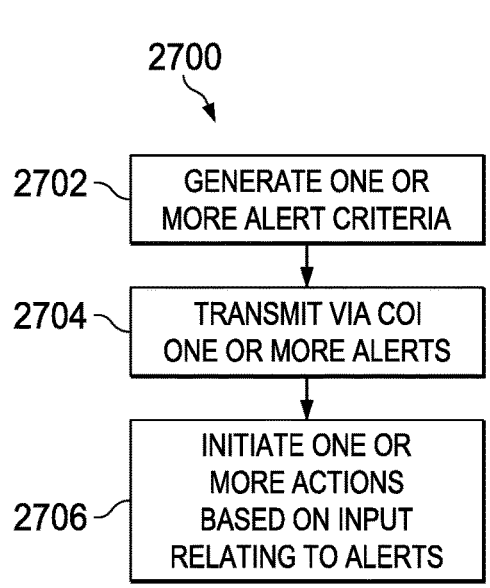
FIG. 27 is a flowchart for one or more alert functions, according to one embodiment.

In FIG. 27, a flowchart for one or more alerts is shown, according to one embodiment. The method 2700 may include generating via one or more processors one or more alert criteria (step 2702). The method 2700 may include transmitting via one or more energy optimizer devices and/or processors one or more alerts (step 2704). The method 2700 may include initiating one or more actions based on inputs relating to the one or more alerts (step 2706). As shown in FIG. 23, the first site 2306 receives an alert from at least one of the one or more utilities 2302 and/or at least one of the one or more energy optimizer systems 2304 requesting that the one or more generators at the first site 2306 be turned on. Based on this alert, one or more generators at the first site 2306 are turned on for a first time period. In another example, the second site 2308 receives an alert from at least one of the one or more utilities 2302 and/or at least one of the one or more energy optimizer systems 2304 regarding a rebate to replace inefficient equipment (e.g., lighting, motors, HVAC). Based on this alert, the second site 2308 may order the equipment, request more information, request a call from their utility and/or energy optimizer representation, and/or acknowledge the alert. In another example, the third site 2310 receives an alert from at least one of the one or more utilities 2302 and/or at least one of the one or more energy optimizer systems 2304 regarding an energy price buy/sell signal. Based on this alert, the third site 2310 may buy and/or sell energy on the retail market, the wholesale market, start up one or more energy equipment (e.g., cogenerators, generators, battery units, etc.), shut down one or more energy equipment (e.g., lights, motors, etc.), and/or any combination thereof. In another example, the Nth site 2312 receives an alert from at least one of the one or more utilities 2302 and/or at least one of the one or more energy optimizer systems 2304 regarding a curtailment function. Based on this alert, the Nth site 2312 may start up one or more energy equipment (e.g., cogenerators, generators, battery units, etc.), shut down one or more energy equipment (e.g., lights, motors, etc.), and/or any combination thereof.

Figure 28:
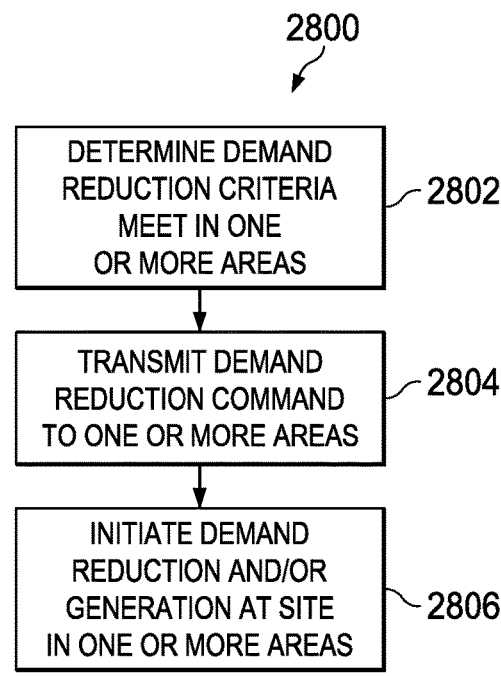
FIG. 28 is a flowchart for one or more demand reduction functions, according to one embodiment.

In FIG. 28, a flowchart for one or more demand reductions is shown, according to one embodiment. A method 2800 may include determining via one or more energy optimizer devices and/or processors a demand reduction criteria for one or more grid areas (step 2802). The method 2800 may transmit via one or more energy optimizer device and/or processors one or more demand reduction commands relating to one or more grid areas (step 2804). The method 2800 may include initiating via the one or more energy optimizer devices and/or processors a demand reduction and/or energy generation at one or more sites in the one or more grid areas (step 2806).

Figure 29:
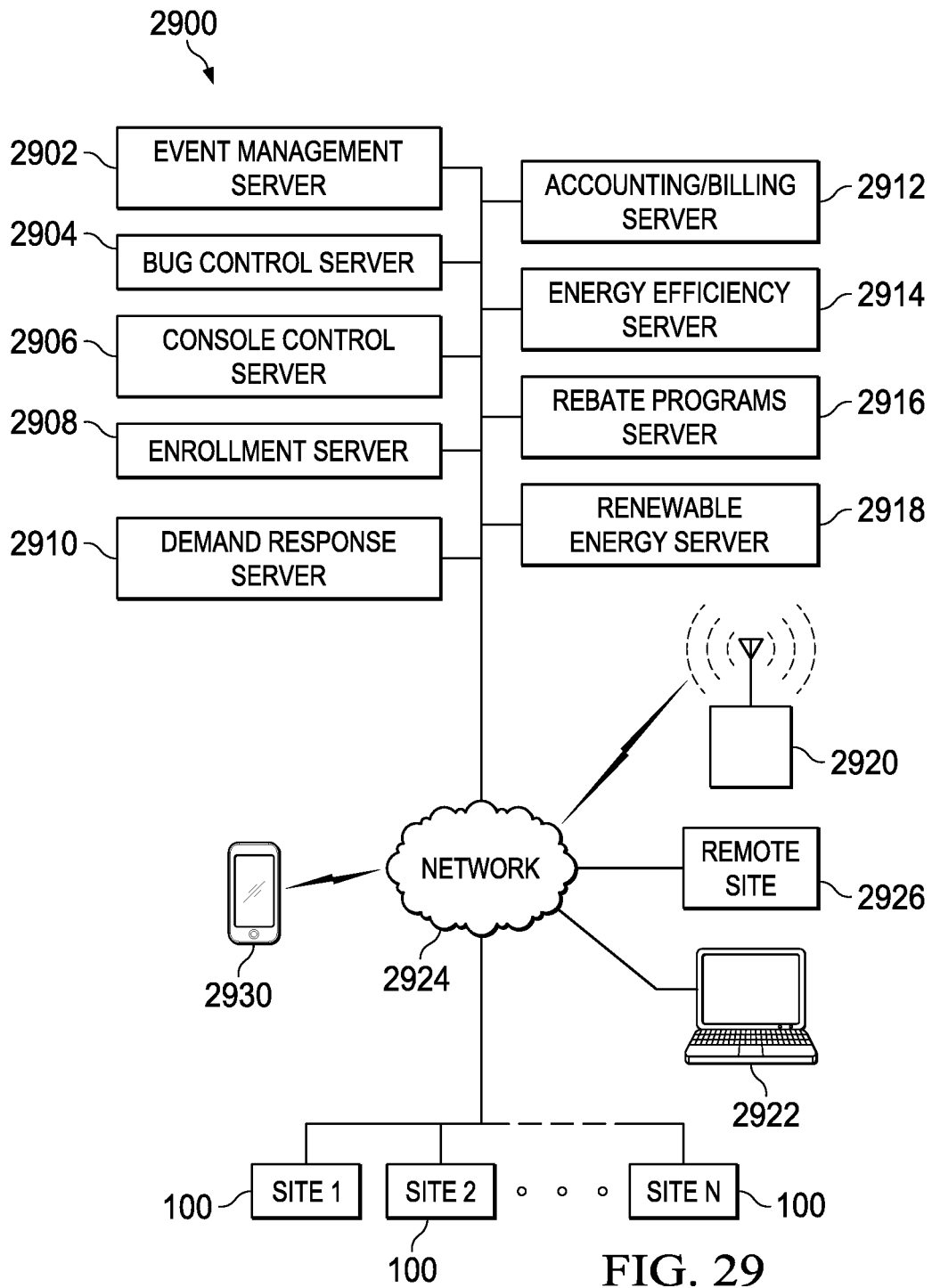
FIG. 29 is an illustration of a network, according to one embodiment.

In FIG. 29, an illustration of a network is shown, according to one embodiment. One or more energy optimizer devices may include an event management server 2902, a bug control server 2904, a console control server 2906, an enrollment server 2908, a demand server 2910, an accounting/billing server 2912, an energy efficiency server 2914, a rebate programs server 2916, and/or a renewable energy server 2918.

One or more energy optimizer devices may be coupled to a network 2924 via a network link 2914. Network 2924 may be the Internet, a private network, and/or a network cloud. Data may transmit to one or more of a mobile phone 2930, one or more energy optimizer devices 100 at various locations, a remote electronic gaming device at a different location in the same property 216, a remote device at a different location 2918, a laptop 2922, and/or any other remote electronic device 2920 and/or one or more remote sites 2926.

Figure 30:
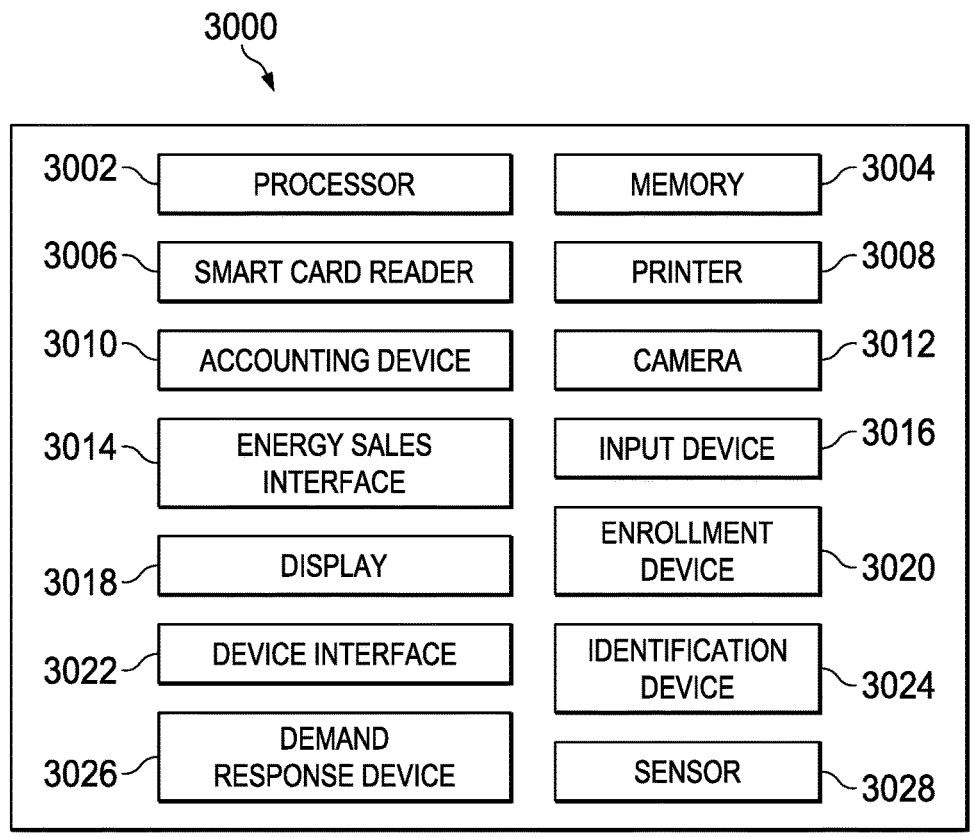
FIG. 30 is an illustration of a block diagram, according to one embodiment.

In FIG. 30, an illustration of a block diagram is shown, according to one embodiment. The block diagram 3000 of energy optimizer device 100 includes a processor 3002, a memory 3004, a smart card reader 3006, a printer 3008, an accounting device 3010, a camera 3012, an energy sales interface 3014, an input device 3016, a display 3018, an enrollment device 3020, a device interface 3022, an identification device 3024, a demand response device 3026, and/or one or more sensors 3028.

Processor 3002 may execute program instructions of memory 3004 and use memory 3004 for data storage. Processor 3002 may also include a numeric co-processor, or a graphics processing unit (or units) for accelerated video encoding and decoding, and/or any combination thereof.

Processor 3002 may include communication interfaces for communicating with energy optimizer device 100, energy optimizer system, and user interfaces to enable communication with all device elements. For example, processor 3002 may interface with memory 3004 to access a client's mobile device through device interface 3022 to display contents onto display 3018.

Memory 3004 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 3004 may also be volatile semiconductor memory such as, dynamic random access memory ("DRAM"), static random access memory ("SRAM"), and/or any combination thereof.

Memory 3004 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 3004 may be used to store read-only program instructions for execution by processor 3002, for the read-write storage for global variables and static variables, read-write storage for uninitialized data, read-write storage for dynamically allocated memory, for the read-write storage of the data structure known as "the stack," and/or any combination thereof.

Smart card reader 3006 may allow energy optimizer device 100 to access and read information provided by the client or technician, which may be used for setting the client's preferences and/or providing maintenance information. For example, smart card reader 3006 may provide an interface between a smart card (inserted by the player) and identification device 3024 to verify the identity of client and/or to initiate one or more actions (e.g., start backup generator).

Printer 3008 may be used for printing one or more reports, graphs, etc.

Camera 3012 may allow energy optimizer device 100 to take images of a site, equipment, and/or the surroundings. For example, the camera 3012 may be utilized to take a picture of one or more pieces of equipment. Based on the picture, the energy and/or performance characteristics of the one or more pieces of equipment are logged into the energy optimizer device and/or system. For example, a first lighting equipment may have a first energy performance (e.g., Watts per lumen, etc.) and a first equipment performance (e.g., lumens, life time hours, etc.). In addition, a second lighting equipment may have a second energy performance and a second equipment performance. Any type of equipment can be logged and/or analyzed in this manner (e.g., lighting, HVAC, motors, ovens, boilers, generators, battery units, cogenerators, etc.).

Network interface 3014 may allow energy optimizer device 100 to communicate with one or more internet sites, server, and/or other energy optimizer devices.

Device interface 3022 may be a Bluetooth interface, a near-field interface, and/or any other interface that allows one device to communicate with another device.

In another example, ABC Utility Company is using the COI Optimizer (one or more energy optimizer devices and/or systems) to defer building additional power plants by utilizing the demand response installed capacity, renewable energy, and energy efficiency credits aggregated under the Application. They are able to determine how much load they have available from certain customer classes, load areas, and/or technology. They can quickly dispatch loads that are intermittent or continuous based on the power grid need. They are able to see if the loads are responding to the notification. If they don't receive a confirmation, they are able to resend notification through five notification methods provided by the COI Energy Optimizer until they receive a confirmation or they need to manually intercede. The participation of loads in the programs and how the loads respond are analyzed in the COI Energy Optimizer Analytics Engine. This gives ABC Utility Company instant reports on customer behaviors and patterns based on the financial incentives available to the customer to act. This enables ABC Utility Company to segment customers for new target marketing opportunities.

We showed various examples of how the technology can work. Please note these examples can be combined in any manner. For example, three elements of the demand response Module can be combined with two elements of the renewable energy Module and so forth. The Smart City Module works in conjunction with all other modules. The Utility may have access to all functionality that helps in optimizing and balancing the grid.

Please note that demand response, energy efficiency, and renewable energy may be OptimizeDR (e.g., demand response), OptimizeEE (e.g., energy efficiency), and OptimizeRE (e.g., renewable energy).

We have incorporated gamification functionality to help encourage users to think about energy optimization more than six minutes a year. The gaming piece includes the following functionality: Engaging; Intuitive (simple); Increases the number of citizens actively improving their energy performance (above the 20% mark that are currently engaged with their utility); Users can see the benefit of their actions faster; It is a cost-effective way of increasing the number of energy efficiency, demand response, and renewable energy assets available to the utility companies for resource planning; The application (and/or device and/or system) can be used for businesses and residential; The App automatically picks up on smart appliances and equipment when user walks in range of technology; User can verify if equipment is smart or not by taking picture of nameplate and clicking "verify check"; The App has a monetizing/reward component for achieving certain levels of problem solving and an open component to receive credits/badges; Users can play in a combination of reality and virtual reality; Users can play by themselves or interact with other players anywhere in the world; and/or it goes viral because it is addicting and appeals to the masses.

In one example of gamification, customers can watch vides to earn rewards and/or incentives. The energy optimizer game (e.g., COI) may have the following cycle: Customer set goals—customer motivated and moves towards goals—customer responds to tips to achieve goals—customer rewarded with badges and cash incentive for reaching one or more points. Customer may receive cash incentives or badges. In addition, customer may be motivated by useful energy tips and alerts to optimize performance. Further, customer may be rewarded in the form of badges and cash incentives. In another example, there may be a comparison with friends, neighbors, and/or businesses. For example, there may be four entries under a name title—Friend 1, Neighbor 1, Friend 2, and Neighbor 2. Friend 1 may have a bronze badge with a 300 energy units saving this month as compared to a 315 energy units saving last month. Whereas, Neighbor 1 has a silver badge with a 445 energy units saving this month as compared to a 460 energy units saving last month (since Neighbor 1 has a higher energy units saving, Neighbor 1 has a higher level badge). Further, Friend 2 has a bronze badge because they have 345 energy units savings this month and 350 energy units saving last month. Lastly, Neighbor 2 has a gold badge because they have 700 energy units saving this month and 650 energy units saving last month which is the highest among the players playing the game at this time. The reason being the percentage of energy saved versus actual energy saved is higher. There may be numerous badge levels (e.g., bronze, silver, gold, platinum, etc.). In one example, all of the badges may be based on the level of credits earned and/or energy units saved. Here is an example for eGames; within the game the user is able to use its Bluetooth device to upload smart equipment and the mobile devices camera to upload old equipment. The equipment uploads to the COI Optimizer's Facility Equipment Inventory System which gives the user credits toward its badge level in the eGame. It also moves user forward or backwards within the game based on the amount of energy waste it consumes from the equipment uploaded. If user accepts recommendations to improve the inefficient equipment and syncs the acceptance with the Energy Optimizer App, it starts the process for processing applicable incentives/rebates for the equipment user agrees to install based on the recommendations. Once the equipment is purchased, the nameplate data is uploaded with serial number and added to both the Energy Optimizer App and the eGames. This results in additional credits which can improve the badge level. Once a certain badge level is reached (i.e. Gold, etc.), user can redeem energy credits for cash.

Gamification—Demand Response (OptimizeDR)

In one example, the User may or may not be enrolled in the Demand Response Program. The User can play the game and get insights and tips about benefits of enrolling in the Demand Response program. The game provides option for the user to select to enroll the capacity identified in the game from the COI Facility Equipment Inventory System. She can upload the curtailment measures from the game to the Application (Optimizer). A request will go to the Energy Optimizer Utility Administration for approval. Once approved, the User provides an e-signature for the consent to enroll and the assets are entered into the program. If they don't they can still continue the game and earn rewards by improving their energy performance in the game and by participating in quizzes and surveys.

Gamification—Energy Efficiency (OptimizeEE)

In one example, the User is able to use its Bluetooth device to upload smart equipment and the mobile devices camera to upload old equipment. The equipment uploads to the COI Optimizer's Facility Equipment Inventory System which gives the user credits toward its badge level in the eGame. It also moves user forward or backwards within the game based on the amount of energy waste it consumes from the equipment uploaded. If user accepts recommendations to improve the inefficient equipment and syncs the acceptance with the Energy Optimizer application, devices, and/or systems, it starts the process for processing applicable incentives/rebates for the equipment user agrees to install based on the recommendations. Once the equipment is purchased, the nameplate data is uploaded with serial number and added to both the Energy Optimizer Application, devices, systems, and/or the eGames. This results in additional credits which can improve the badge level. Once a certain badge level is reached (i.e. Gold, etc.), user can redeem energy credits for cash.

Gamification—Renewable Energy (OptimizeRE)

In one example, the User can add various renewable resources to their virtual reality avatar to make it stronger and earn higher badges and incentives in the real world. The gamification module will give User useful tips and alerts about renewable energy rebates provided by the utility. With each renewable source they register with the utility using the gamification module they will level up and get rewards and incentives. They will also get rewarded if request for more information on upgrading to renewable energy in the future. Rewards are based on customer interest and willingness to upgrade in the future.

Gamification Incentives/Rebates (OptimizeIN)

In one example, the gamification module shows the User the incentives and rebates he qualifies for based on the equipment he uploaded in the game. If the User selects to upgrade equipment or purchase a new solar system based on the game recommendations, he only needs to sync the game with the Application, devices, and/or systems to start process for the incentives and rebates. He will receive a credit in his merchant account based on the amount of the rebate available to him after installation is verified through the Bluetooth technology.

In another example, the Educate Module within the game also educates the User on all the rebates and incentives it qualifies for based on information shared in the game experience.

In various other examples, the examples and disclosures shown in this document may be utilized in supply chain management for monitoring and selling excess inventory.

In one embodiment, an energy device may include a memory where the memory includes one or more energy modules (e.g., bug control module, console control module, equipment X module (X can be any number from 0 to infinite), an enrollment module, a demand response module, an accounting module, a billing module, an energy selling module, an energy buying module, an energy efficiency module, a rebates module, a renewable energy module, a first utility module, a second utility module, an Nth utility module, a first energy using profile module, a second energy using profile module, an Nth energy using profile module, a first energy site module, a second energy site module, an nth energy site module, a first machine learning module, a second machine learning module, an Nth machine learning module, a first smart city module, a second smart city module, an Nth smart city module, a first smart device module, a second smart device module, and/or an Nth smart device module). The energy device may include a transceiver, one or more processors which may communicate via the transceiver with one or more energy devices, and a display which may display a dashboard of energy options (e.g., bug control, console control, monitoring equipment 1 to N, controlling equipment 1 to N, energy program enrollment options, demand response options, energy efficiency options, rebate options, renewable energy options, buy and/or selling energy options, equipment performance reports, energy outage reports, grid issue reports, generation reports, smart city energy options, energy user options, and/or any combination thereof) based on one or more signals received from the one or more processors. In one example, the one or more external energy devices transmit at least one of energy information and equipment information to the energy device which is utilized in a database relating to the one or more external energy devices. For example as shown in FIG. 25, one or more energy devices communicate via Bluetooth (and/or any other communication technology—nearfield) to the one or more energy optimizer devices and/or systems. In this example, a first device may be a motor which transmits that it was manufactured in 2017, is a 10 HP motor, has a variable drive, and is utilized to mix flour. In another example, a second device may be an oven which transmits that is was manufactured in 2016, is a 1,000,000 BTU an hour capacity oven, and it is used to bake cakes. Further, an Nth device may be a lighting device which transmits that is was manufactured in 2010, is a 1000 lumen device, has 4000 hours of useful life left, and uses 100 watts of energy an hour. In another example, this information may be obtained by taking a picture of the equipment in general and/or its name plate. When a picture is taken of the equipment in general, the picture may be compared to a database to determine what the equipment is.

In another example, the one or more processors may transmit a control signal to an external energy device located at a remote location to initiate one or more functions of the external energy device (e.g., turn on, turn off, maintain a predetermined level, maintain a level that maintains a specific energy load at the meter, etc.). In another embodiment, the external energy device is a generator and the one or more functions may be a start-up function, a shutdown function, and/or a load management function.

In another embodiment, the one or more processors may determine via machine learning an energy profile for an energy source based on energy data obtain via one or more sensors associated with the energy source. In addition, the energy source may be a heating, ventilation, and air conditioning system (and/or a lighting load, a motor load, a computer load, a generator, an industrial oven, an oven, a microwave, an RF heating unit, a water treatment unit, and/or any other type of energy load).

In another example, the dashboard may be modified based on the determination that the energy source is the heating, ventilation, and air conditioning system (and/or a lighting load, a motor load, a computer load, a generator, an industrial oven, an oven, a microwave, an RF heating unit, a water treatment unit, and/or any other type of energy load). Since the HVAC is known, the dashboard may now display energy usage data, energy efficiency options, cost data, etc.

In another example, the one or more processors may transmit via the transmitter one or more control signals to the heating, ventilation, and air conditioning system based on one or more alerts. Further, the one or more processors may transmit a signal to a utility based on a feedback signal received from the heating, ventilation, and air conditioning system. In addition, the one or more external energy devices at various locations may be able to have two-way communications relating to energy issues with the energy device.

In another embodiment, an energy system may include a first energy device for a first energy customer of an energy provider and a second energy device for a second energy customer of the energy provider. Further, the first energy device may provide a purchase energy option and a sell energy option to the second energy customer via the second energy device without any interaction with the energy provider (in another example limited interaction with the energy provider may be done—accounting, billing, notice). Further, the second energy device may provide a purchase energy option confirmation and a sell energy confirmation to the first energy customer via the first energy device without any interaction with the energy provider (in another example limited interaction with the energy provider may be done—accounting, billing, notice).

In another example, a peer-to-peer communication functionality may enabled between the first energy device, the second energy device, and a third energy device where the third energy device is for a third energy customer of a second energy provider. In addition, the peer-to-peer communication functionality may allow for energy purchases between the first energy customer, the second energy customer, and the third energy customer without any interaction with the energy provider and the second energy provider. Further, the peer-to-peer communication functionality may enable a plurality of energy options to be communicated between the first energy customer, the second energy customer, and the third energy customer. In addition, the plurality of energy options may include an energy curtailment option, an energy efficiency option, a renewable energy option, an energy teaching option, and/or any other option in this disclosure.

In another embodiment, an energy device may include a memory where the memory including one or more energy modules (e.g., bug control module, console control module, equipment X module (X can be any number from 0 to infinite), an enrollment module, a demand response module, an accounting module, a billing module, an energy selling module, an energy buying module, an energy efficiency module, a rebates module, a renewable energy module, a first utility module, a second utility module, an Nth utility module, a first energy using profile module, a second energy using profile module, an Nth energy using profile module, a first energy site module, a second energy site module, an nth energy site module, a first machine learning module, a second machine learning module, an Nth machine learning module, a first smart city module, a second smart city module, an Nth smart city module, a first smart device module, a second smart device module, and/or an Nth smart device module). The energy device may include a transceiver, one or more processors which may communicate via the transceiver with at least a first energy device located at a first site of a first energy user and at least a second energy device located at a second site of a second energy user. Further, the one or more processors may receive a grid issue alert. In addition, the one or more processors may transmit one or more control signals to at least one of the first energy device and the second energy device based on the grid issue alert. In another example, a first control signal may turn on the first energy device which is a generator and turns on the second energy device which is a battery unit. In addition, the first energy user and the second energy user are located in a first grid area where a third energy user and a fourth energy user are located in a second grid area and the one or more processors may receive a grid issue alert. In this example, the one or more processors may determine an effect grid based on the grid issue alert, wherein based on the one or more processors determining that the grid issue alert relates to the second grid area transmitting one or more control signals to energy equipment located at least one of the third energy user and the fourth energy user.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

It should be noted that changes in the data facilitate computational analysis of one or more signals. In addition, the energy optimizer device, systems, machine learning, equipment profile analysis, energy profile analysis, and/or applications either individuals and/or in combination facilitate computational analysis of one or more signals.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed. Further, one or more gaming options may be Internet based gaming options. Therefore, all of the examples and/or embodiments may be utilized via an Internet based gaming system.

The invention claimed is:

1. An energy optimizer device comprising:
 a sensor configured to receive equipment data associated with a first external energy equipment in or surrounding a building;
 a display;
 a communication portal configured to communicate with at least a second energy optimizer device associated with a second user, wherein the second energy optimizer device comprises:
  a sensor configured to receive equipment data associated with a second external energy equipment in or surrounding a building;
  a display; and
  one or more processors configured to execute the electronic game of energy saving by:
   receiving, via the sensor of the second energy optimizer device, the equipment data associated with the second external energy equipment;
   uploading the equipment data associated with the second external energy equipment to an asset registry system;
   receiving a recommendation of energy efficiency measures for the second user indicative of one or more of equipment upgrades, technology upgrades, equipment optimization, or behavior changes to improve energy performance of facility, wherein the recommendation for the second user is based on the equipment data uploaded by the second energy optimizer device;
   receiving user interaction in the electronic game indicating a user acceptance of the recommended energy efficiency measures for the second user;
   receiving, from the asset registry system, user credit data for the second user based at least in part on amount of energy waste consumed by the second external energy equipment;
   receiving a score for the second user indicating a reduction of energy waste consumed by the second external energy equipment as a result of implementation of the recommended energy efficiency measures for the second user based in part on the user credit data for the second user; and
   rendering the score for the second user in the electronic game on the display of the second energy optimizer device; and
 at least one processor configured to execute an electronic game of energy saving by:
  receiving, via the sensor, the equipment data associated with the first external energy equipment, the sensor comprising a camera, the equipment data comprising at least a manufacturing date and power consumption of the first external energy equipment captured by the camera;
  uploading the equipment data associated with the first external energy equipment to the asset registry system;
  receiving a recommendation of energy efficiency measures indicative of one or more of equipment upgrades, technology upgrades, equipment optimization, or behavior changes to improve energy performance of facility, wherein the recommendation is based in part on the manufacturing date and the power consumption in the equipment data captured by the camera;
  receiving user interaction in the electronic game indicating a user acceptance of the recommended energy efficiency measures;
  receiving, from the asset registry system, user credit data based at least in part on amount of energy waste consumed by the first external energy equipment;
  receiving a score indicating a reduction of energy waste consumed by the first external energy equipment as a result of implementation of the recommended energy efficiency measures based in part on the user credit data;
  communicating, with the second energy optimizer device via the communication portal, peer-to-peer data indicating the score for the second user; and
  rendering the score in the electronic game on the display simultaneously with:

rendering the score for the second user in the electronic game on the display; and
rendering the score for the second user in the electronic game on the display of the second energy optimizer device;
wherein the at least one processor is further configured to:
determine, at a first time, amount of excess energy capacity that can be traded with at least a third user, based on the reduction of energy waste consumed by the first external energy equipment as a result of implementation of the recommended energy efficiency measures; and
provide the amount of excess energy capacity, at a future time after the first time, to at least an energy device associated with the at least the third user.

2. The energy optimizer device of claim 1, wherein the camera is configured to capture an image of a name plate on the first external energy equipment in or surrounding the building, wherein the name plate contains the equipment data.

3. The energy optimizer device of claim 1, wherein the sensor comprises a communication interface configured to communicate with the first external energy equipment, and wherein receiving the equipment data associated with the first external energy equipment comprises receiving, via the communication interface, the equipment data from the first external energy equipment.

4. The energy optimizer device of claim 1, wherein the score is based on the equipment upgrades, technology upgrades, equipment optimization, or behavior changes to improve energy performance of facility, each having a respective weight.

5. The energy optimizer device of claim 1, wherein the at least one processor is further configured to:
upon receiving the user interaction indicating the user acceptance of the recommended energy efficiency measures, trigger execution of a program for processing application of incentives/rebates for the recommended energy efficiency measures using a machine learning model based on the equipment data in the asset registry system and a user profile of a user associated with the energy optimizer device; and
receive, via the communication interface, equipment data from the recommended energy efficiency measures; and
in response to receiving the equipment data from the recommended energy efficiency measures via the communication interface, send data indicating implementation of the recommended energy efficiency measures to the program for processing the application of incentives/rebates for the recommended energy efficiency measures, wherein the implementation of the recommended energy efficiency measures includes recommended equipment upgrades, recommended technology upgrades, recommended equipment optimization, or recommended behavior changes to improve energy performance of facility.

6. The energy optimizer device of claim 1, wherein the at least one processor is further configured to, in response to receiving data indicating completion of purchase of recommended energy equipment:
receive, via the sensor, equipment data associated with the recommended energy equipment;
upload the equipment data associated with the recommended energy equipment to the asset registry system;
receive updated score in the electronic game based in part on the uploaded equipment data associated with the recommended energy equipment; and
render the updated score in the electronic game on the display.

7. The energy optimizer device of claim 1, wherein the at least one processor is further configured to:
cause the electronic game to provide, from the asset registry system, enrollment options of a demand management program corresponding to the recommended energy efficiency measures;
receive, from the electronic game, energy efficiency measures in response to user interaction from the electronic game, the user interaction indicating a user selection from the enrollment options provided in the electronic game; and
upload the energy efficiency measures to an executable application for processing a request of enrollment associated with the user selection from the enrollment options.

8. The energy optimizer device of claim 1, wherein the at least one processor is further configured to enable registering of one or more renewable sources, wherein executing the electronic game comprises rendering in part a virtual reality avatar, the virtual reality avatar having a size that increases with a number of renewable sources registered increasing.

9. The energy optimizer device of claim 8, wherein the at least one processor is further configured to, responsive to registering of the one or more renewable sources:
receive updated score in the electronic game; and
render the updated score in the electronic game on the display.

10. The energy optimizer device of claim 1, wherein a user associated with the energy optimizer device is a business user and the at least the third user is a non-business user.

11. A method comprising:
by at least one processor of an energy optimizer device associated with a first user, executing an electronic game of energy saving, by:
receiving, via a camera of a sensor of the energy optimizer device, equipment data associated with a first external energy equipment in or surrounding a building, the equipment data comprising at least a manufacturing date and power consumption of the first external energy equipment captured by the camera;
uploading the equipment data associated with the first external energy equipment to an asset registry system;
receiving a recommendation of energy efficiency measures indicative of one or more of equipment upgrades, technology upgrades, equipment optimization, or behavior changes to improve energy performance of facility, wherein the recommendation is based in part on the manufacturing date and the power consumption in the equipment data captured by the camera;
receiving user interaction in the electronic game indicating a user acceptance of the recommended energy efficiency measures;
receiving, from the asset registry system, user credit data based at least in part on amount of energy waste consumed by the first external energy equipment;
receiving a score for the first user indicating a reduction of energy waste consumed by the first external energy equipment as a result of implementation of the recommended energy efficiency measures based in part on the user credit data;

communicating, with at least an additional energy optimizer device associated with a second user via a communication portal, peer-to-peer data indicating score for the second user, wherein the additional energy optimizer device comprises one or more processors configured to execute an electronic game of energy saving by:

receiving, via a sensor of the additional energy optimizer device, equipment data associated with a second external energy equipment;

uploading the equipment data associated with the second external energy equipment to the asset registry system;

receiving a recommendation of energy efficiency measures for the second user, the recommendation of energy efficiency measures being indicative of one or more of equipment upgrades, technology upgrades, equipment optimization, or behavior changes to improve energy performance of facility, wherein the recommendation for the second user is based on the equipment data uploaded by the additional energy optimizer device;

receiving user interaction in the electronic game indicating a user acceptance of the recommended energy efficiency measures for the second user;

receiving, from the asset registry system, user credit data for the second user based at least in part on amount of energy waste consumed by the second external energy equipment;

receiving a score for the second user, the score indicating a reduction of energy waste consumed by the second external energy equipment as a result of implementation of the recommended energy efficiency measures for the second user based in part on the user credit data for the second user; and rendering the score for the second user in the electronic game on the display of the additional energy optimizer device;

rendering the score for the first user in the electronic game on a display of the energy optimizer device simultaneously with:

rendering the score for the second user in the electronic game on the display of the energy optimizer device; and rendering the score for the second user in the electronic game on the display of the additional energy optimizer device; and by the at least one processor of the energy optimizer device associated with the first user:

determining, at a first time, amount of excess energy capacity that can be traded with at least a third user on a grid, based on the reduction of energy waste consumed by the first external energy equipment as a result of implementation of the recommended energy efficiency measures; and provide the amount of excess energy capacity, at a future time after the first time, to at least an energy device associated with the at least the third user.

12. The method of claim 11, wherein receiving the equipment data associated with the first external energy equipment comprises receiving an image containing a name plate of the first external energy equipment in or surrounding the building from the camera, wherein the image contains the equipment data.

13. The method of claim 11, wherein receiving the equipment data associated with the first external energy equipment comprises receiving, via a communication interface, the equipment data from the first external energy equipment.

14. The method of claim 11, further comprising:

upon receiving the user interaction indicating the user acceptance of the recommended energy efficiency measures, triggering execution of a program for processing application of incentives/rebates for the recommended energy efficiency measures using a machine learning model based on the equipment data in the asset registry system and a user profile of the first user; and receiving, via the communication interface, equipment data from the recommended energy efficiency measures; and in response to receiving the equipment data from the recommended energy efficiency measures via the communication interface, sending data indicating implementation of the recommended energy efficiency measures to the program for processing the application of incentives/rebates for the recommended energy efficiency measures, wherein the implementation of the recommended energy efficiency measures includes recommended equipment upgrades, recommended technology upgrades, recommended equipment optimization, or recommended behavior changes to improve energy performance of facility.

15. The method of claim 11, further comprising, in response to receiving data indicating completion of purchase of recommended energy equipment:

receiving, via the sensor, equipment data associated with the recommended energy equipment;

uploading the equipment data associated with the recommended energy equipment to the asset registry system;

receiving updated score in the electronic game based in part on the uploaded equipment data associated with the recommended energy equipment; and rendering the updated score in the electronic game on the display.

16. A non-transitory computer readable medium containing program instructions that, when executed, cause at least one processor of a first energy optimizer device associated with a first user to:

execute an electronic game of energy saving, by:

receiving, via a camera of a sensor, equipment data associated with a first external energy equipment in or surrounding a building, the equipment data comprising at least a manufacturing date and power consumption of the first external energy equipment captured by the camera;

uploading the equipment data associated with the first external energy equipment to an asset registry system;

receiving a recommendation of energy efficiency measures indicative of one or more of equipment upgrades, technology upgrades, equipment optimization, or behavior changes to improve energy performance of facility, wherein the recommendation is based in part on the manufacturing date and the power consumption in the equipment data captured by the camera;

receiving user interaction in the electronic game indicating a user acceptance of the recommended energy efficiency measures;

receiving, from the asset registry system, user credit data for the first user based at least in part on amount of energy waste consumed by the first external energy equipment;

receiving a score for the first user indicating a reduction of energy waste consumed by the first external energy equipment as a result of implementation of the recommended energy efficiency measures based in part on the user credit data;

communicating, with at least an additional energy optimizer device associated with a second user, peer-to-peer data indicating score for the second user, wherein the additional energy optimizer device comprises one or more processors configured to execute an electronic game of energy saving by:

receiving, via a sensor of the additional energy optimizer device, equipment data associated with a second external energy equipment;

uploading the equipment data associated with the second external energy equipment to the asset registry system;

receiving a recommendation of energy efficiency measures for the second user, the recommendation of energy efficiency measures being indicative of one or more of equipment upgrades, technology upgrades, equipment optimization, or behavior changes to improve energy performance of facility, wherein the recommendation for the second user is based on the equipment data uploaded by the additional energy optimizer device;

receiving user interaction in the electronic game indicating a user acceptance of the recommended energy efficiency measures for the second user;

receiving, from the asset registry system, user credit data for the second user based at least in part on amount of energy waste consumed by the second external energy equipment;

receiving the score for the second user, the score indicating a reduction of energy waste consumed by the second external energy equipment as a result of implementation of the recommended energy efficiency measures for the second user based in part on the user credit data for the second user; and rendering the score for the second user in the electronic game on the display of the additional energy optimizer device;

rendering the score for the first user in the electronic game on a display of the first energy optimizer device simultaneously with:

rendering the score for the second user in the electronic game on the display of the energy optimizer device; and rendering the score for the second user in the electronic game on the display of the additional energy optimizer device;

determine, at a first time, amount of excess energy capacity that can be traded with at least a third user on a grid, based on the reduction of energy waste consumed by the first external energy equipment as a result of implementation of the recommended energy efficiency measures; and provide the amount of excess energy capacity, at a future time after the first time, to at least an energy device associated with the at least the third user.

17. The non-transitory computer readable medium of claim 16, wherein the score for the first user is based on the equipment upgrades, technology upgrades, equipment optimization, or behavior changes to improve energy performance of facility, each having a respective weight.

18. The non-transitory computer readable medium of claim 16 further containing program instructions that, when executed, cause the at least one processor of the first energy optimizer device to:

cause the electronic game to provide, from the asset registry system, enrollment options of a demand management program corresponding to the recommended energy efficiency measures;

receive, from the electronic game, energy efficiency measures in response to user interaction from the electronic game, the user interaction indicating a user selection from the enrollment options provided in the electronic game; and upload the energy efficiency measures to an executable application for processing a request of enrollment associated with the user selection from the enrollment options.

19. The non-transitory computer readable medium of claim 16 further containing program instructions that, when executed, cause the at least one processor of the first energy optimizer device to:

enable registering of one or more renewable sources, wherein executing the electronic game comprises rendering in part a virtual reality avatar, the virtual reality avatar having a size that increases with a number of renewable sources registered increasing.

20. The non-transitory computer readable medium of claim 19 further containing program instructions that, when executed, cause the at least one processor of the first energy optimizer device to, responsive to registering of the one or more renewable sources:

receive updated score in the electronic game; and render the updated score in the electronic game on the display.

\* \* \* \* \*